United States Patent
Sasson et al.

(10) Patent No.: US 10,944,119 B2
(45) Date of Patent: Mar. 9, 2021

(54) METHODS AND DEVICES FOR STORAGE AND RELEASE OF HYDROGEN

(71) Applicants: Yissum Research Development Company of the Hebrew University of Jerusalem LTD., Jerusalem (IL); Energystoredge LTD., Jerusalem (IL)

(72) Inventors: Yoel Sasson, Jerusalem (IL); Judith Toubiana, Jerusalem (IL); Ariel Givant, Jerusalem (IL); Sorel Rothschild, Jerusalem (IL)

(73) Assignees: Yissum Research Development Company of the Hebrew University of Jerusalem Ltd., Jerusalem (IL); Energystoredge Ltd., Jerusalem (IL)

( * ) Notice: Subject to any disclaimer, the term of this patent is extended or adjusted under 35 U.S.C. 154(b) by 343 days.

(21) Appl. No.: 15/573,634

(22) PCT Filed: May 13, 2016

(86) PCT No.: PCT/IL2016/050506
§ 371 (c)(1),
(2) Date: Nov. 13, 2017

(87) PCT Pub. No.: WO2016/181401
PCT Pub. Date: Nov. 17, 2016

(65) Prior Publication Data
US 2018/0123153 A1    May 3, 2018

Related U.S. Application Data

(60) Provisional application No. 62/160,624, filed on May 13, 2015.

(51) Int. Cl.
*H01M 8/06* (2016.01)
*C01B 3/00* (2006.01)
(Continued)

(52) U.S. Cl.
CPC .......... *H01M 8/0618* (2013.01); *B01J 7/02* (2013.01); *C01B 3/0015* (2013.01);
(Continued)

(58) Field of Classification Search
None
See application file for complete search history.

(56) References Cited

U.S. PATENT DOCUMENTS 4,067,958 A * 1/1978 Gorin ............... B01J 27/047
423/246
4,137,298 A   1/1979 Zielke et al.
(Continued)

FOREIGN PATENT DOCUMENTS

CA      2928999 A1    4/2015
CN    101541668 A    9/2009
(Continued)

OTHER PUBLICATIONS

Boddien, et al. "CO2-'Neutral' Hydrogen Storage Based on Bicarbonates and Formates", Angewandte Chemie International Ed., May 23, 2011, pp. 6411-6414, vol. 50, No. 28, Wiley, Weinheim.
(Continued)

*Primary Examiner* — Wayne A Langel
(74) *Attorney, Agent, or Firm* — Ohlandt, Greeley, Ruggiero & Perle, L.L.P.

(57) ABSTRACT

The invention relates to a process for generating hydrogen, comprising decomposing in a reaction vessel aqueous alkali formate in the presence of a transition metal-containing catalyst system dissolved in one or more organic solvent(s), characterized in that said organic solvent(s) comprise at least one solvent which is water-immiscible, thereby releasing hydrogen and forming bicarbonate in the aqueous phase, and
(Continued)

separating the catalyst-containing organic solvent(s) from said bicarbonate. Also disclosed are apparatuses for carrying out hydrogen generation.

22 Claims, 10 Drawing Sheets

(51) Int. Cl.
    *C01B 3/22*     (2006.01)
    *H01M 8/0612*     (2016.01)
    *B01J 7/02*     (2006.01)
    *H01M 8/04089*     (2016.01)
    *H01M 8/04082*     (2016.01)

(52) U.S. Cl.
    CPC .............. *C01B 3/0073* (2013.01); *C01B 3/22* (2013.01); *H01M 8/04089* (2013.01); *H01M 8/04201* (2013.01); *H01M 8/0612* (2013.01); *C01B 2203/0277* (2013.01); *Y02E 60/32* (2013.01)

(56) References Cited

U.S. PATENT DOCUMENTS

| | | |
|---|---|---|
| 4,372,833 A | 2/1983 | King, Jr. et al. |
| 2012/0126178 A1 | 5/2012 | Baldauf et al. |

FOREIGN PATENT DOCUMENTS

| | | |
|---|---|---|
| CN | 104203892 A | 12/2014 |
| WO | 198805422 A1 | 7/1988 |
| WO | 2015040440 A2 | 3/2015 |
| WO | 2015068161 A1 | 5/2015 |

OTHER PUBLICATIONS

Written Opinion in the corresponding International Application PCT/IL2016/050506, 6 pages, dated Jul. 20, 2016.
International Search report for the corresponding International Application PCT/IL2016/050506, 7 pages, dated Jul. 20, 2016.
German Search Report dated Dec. 25, 2019 from corresponding German Patent Application No. 201680040965.0, 12 pages.

* cited by examiner

METHODS AND DEVICES FOR STORAGE AND RELEASE OF HYDROGEN

The invention relates to a method for storage of hydrogen in a chemical carrier, in a safe and transportable form, and the release of hydrogen on demand, based on the bicarbonate-formate cyclic system.

The bicarbonate-formate cycle consists of two chemical reactions, as shown by the following scheme:

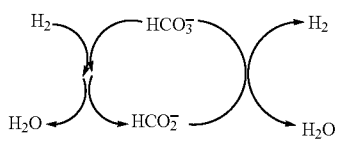

The cycle is also represented herein by the following chemical equation (where M indicates an alkali metal):

$$MHCO_3 + H_2 \leftrightarrow MHCO_2 + H_2O$$

The reaction from left to right is the hydrogenation of bicarbonate to give the corresponding formate, whereby hydrogen is stored, i.e., the resultant formate salt is a hydrogen carrier. On demand, the reverse reaction (dehydrogenation) is carried out to release hydrogen: the formate is decomposed to produce bicarbonate and hydrogen which can be used for any desired purpose, e.g., as a fuel material.

The hydrogenation and dehydrogenation reactions are both advanced with the aid of a catalyst, which may be the same or different. For a reversible hydrogen storage cycle to gain significant commercial acceptance, the catalyst of choice must be highly active and easily separable and regenerable. A reversible hydrogen storage cycle based on the use of a concentrated solution of potassium formate is demonstrated in co-assigned international patent application no. PCT/IL2014/050965 (≡WO 2015/068161), where it has been shown that with the aid of palladium on carbon catalyst, a concentrated potassium formate solution (>4M and up to 16M) decomposes to generate hydrogen and a slurry consisting of solid bicarbonate and catalyst particles. The catalyst can be easily regenerated on treating the slurry with a stream of air. The same catalyst is also effective in the reverse reaction, i.e., the conversion of potassium bicarbonate slurry to an aqueous solution of potassium formate. In this way, the hydrogen storage cycle may run for many times, with occasional catalyst regeneration taking place within the slurry (for example, in the reactor).

The solubility curves of potassium bicarbonate and potassium formate in the temperature ranges from 0 to 70° C. and 0 to 90° C., respectively, are shown in FIG. 1, illustrating the difference in solubility between the two salts. The reduced solubility of potassium bicarbonate in comparison to potassium formate may therefore introduce limitations into the $KHCO_3 + H_2 \leftrightarrow KHCO_2 + H_2O$ system, taking into consideration that solid catalysts such as palladium on carbon cannot be easily separated from the bicarbonate slurry.

It has now been found that the dehydrogenation reaction of aqueous $MHCO_2$ is catalyzed effectively with the aid of a metal complex, such as ruthenium-containing complex, dissolved in a suitable organic solvent. Hydrogen gas is generated while the bicarbonate is progressively formed in the aqueous phase, with the organic solvent remaining separable from the bicarbonate throughout the reaction. In this way we are able to recover a catalyst-free solid bicarbonate, which is safer for handling, storage and transportation. Additionally, the use of an easily separable, catalyst-containing organic phase allows the process to run under a continuous mode of operation, with greatly improved recyclability and manageability.

Notably, the hydrogenation reaction, i.e., the conversion of bicarbonate to formate on reaction with hydrogen, can be catalyzed effectively with the aid of the same catalytic system consisting of a ruthenium-containing complex dissolved in a suitable organic solvent, thereby enabling a reversible hydrogen storage cycle, with neither catalyst nor solvent change between consecutive reactions.

Alternatively, the reversible hydrogen storage cycle based on the $KHCO_3 + H_2 \leftrightarrow KHCO_2 + H_2O$ reactions can also operate with the aid of two different catalysts. According to this process design, a solid catalyst, such as palladium supported on carbon illustrated in PCT/IL2014/050965, is employed for catalyzing the hydrogenation of a bicarbonate slurry to form a concentrated aqueous solution of potassium formate. To generate hydrogen, the concentrated formate solution undergoes dehydrogenation as described above, in the presence of a catalyst system consisting of a metal-containing complex dissolved in a suitable organic solvent.

Boddien, Gartner, Federsel, Sponholz, Mellmann, Jackstell, Junge and Beller [Angew. Chem. Int. Ed. 50, p. 6411-6414(2011)] tested the catalytic activity of a ruthenium-containing compound, formed in situ on reacting [{$RuCl_2$(benzene)}$_2$] and 1,1-bis(diphenylphosphino)methane, in the $MHCO_3 + H_2 \leftrightarrow MHCO_2 + H_2O$ system. The catalyst has been shown to promote the generation of hydrogen from different formate salts in a mixture consisting of water and dimethylformide (DMF), with sodium formate emerging as the best hydrogen carrier. However, experimental work conducted in support of this invention shows that with aqueous DMF, the solvent of choice according to Boddien et al., the reaction mixture gradually turns into unmanageable reaction mass. Hydrogenation reactions of different bicarbonate salts in the presence of the aforementioned catalyst are also reported by the authors. However, for the hydrogenation reactions, the authors switched to a different solvent (a mixture of water and tetrahydrofuran (THF)).

SUMMARY OF THE INVENTION

The present invention is therefore primarily directed to a process for generating hydrogen, comprising decomposing (i.e., dehydrogenating) in a reaction vessel aqueous alkali formate ($MHCO_2$), preferably aqueous $KHCO_2$, in the presence of a transition metal-containing catalyst system dissolved in one or more organic solvent(s), characterized in that said organic solvent(s) comprise at least one solvent which is water-immiscible, thereby releasing hydrogen and forming bicarbonate in the aqueous phase, and separating the catalyst-containing organic solvent from said bicarbonate.

The separation of the organic phase may take place either continuously during the reaction under steady state mode of operation or at a selected conversion in batch reaction, allowing the recovery of catalyst-free bicarbonate and reuse of the catalyst dissolved in the organic solvent.

The concentration of formate salt in the aqueous solution is preferably not less than 4M, e.g., from 4M to 10M for $NaHCO_2$ and from 4M to 16M for $KHCO_2$, more preferably 12M to 16M for the $KHCO_2$ solution. The dehydrogenation reaction proceeds effectively at a temperature in the range from 20 to 100° C., more preferably from 20 to 85° C. and most preferably from 40 to 80° C. The reaction may be carried out at various pressures, preferably under atmospheric pressure.

Turning now to the catalyst system, in its most general form, the catalyst system (which is soluble in the organic phase of the reaction mixture) comprises a transition metal, in particular a platinum-group metal, such as ruthenium, rhodium, palladium and iridium. Ruthenium is the preferred metal. The catalyst system comprises a catalyst precursor, i.e., a metal ion-containing compound, such as a metal complex or a metal salt, which on activation by reduction, turns into the reduced, catalytically active metal form. Optionally, the catalyst system comprises a phosphorous ligand.

It should be noted that a phosphorous ligand may be either incorporated within a catalyst precursor metal complex as one of its original ligands, combined with a catalyst precursor metal complex in solution, or both. When a catalyst precursor metal complex is combined with a phosphorous ligand in solution, this phosphorous ligand is sometimes named herein an "additive phosphorous ligand".

DETAILED DESCRIPTION OF THE INVENTION

Figure 1:
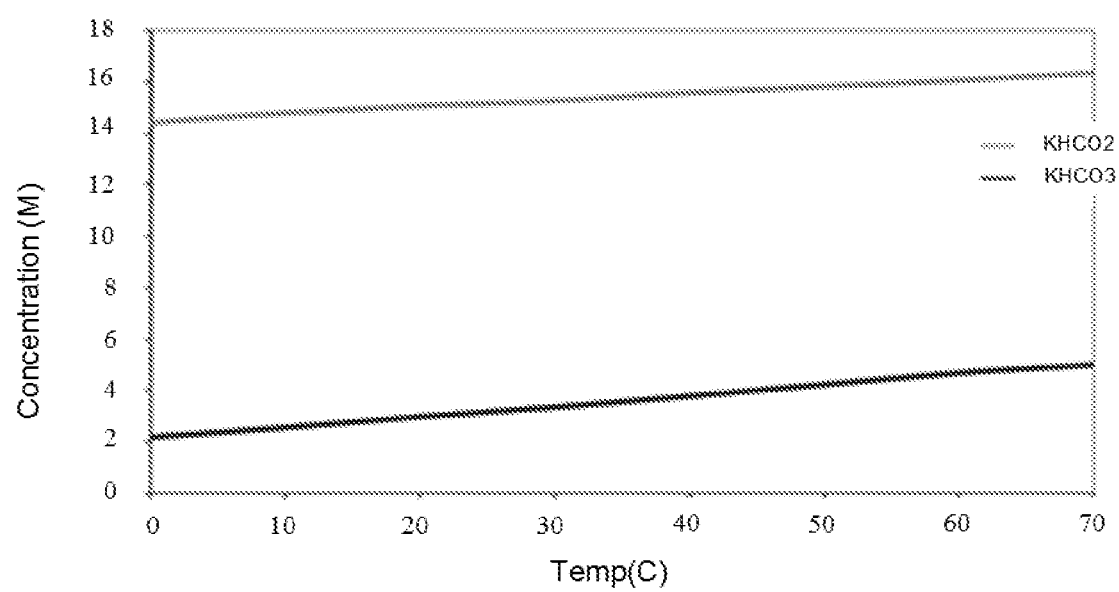
FIG. 1 shows the solubility curves of potassium bicarbonate and potassium formate.

As mentioned above, ruthenium is the preferred platinum-group metal; ruthenium catalyst precursors that can be dissolved in an organic solvent to advance the decomposition of aqueous $MHCO_2$ in the absence of additive phosphorous donor ligand include: carbonylhydrido[6-(di-t-butylphosphinomethylene)-2-(N,N-diethylaminomethyl)-1,6-dihydropyridine] ruthenium(II), {known as Milstein's catalyst}; Dichloro(1,5-cyclooctadiene)ruthenium(II), polymer {abbreviated [Ru(COD)Cl$_2$]n) and Carbonylchlorohydrido{bis[2-(diphenylphosphinomethyl)ethyl]amino}ethyl]amino}ruthenium (II) (available as Ru-MACHO®}.

On the other hand, catalyst precursors such as [IrCl(CO)[P(Ph)$_3$]$_2$], [RhCl[P(Ph)$_3$]$_3$], [Pd(OAc)$_2$], RuCl$_3$, RuCl$_2$[P(Ph)$_3$]$_3$ and [RuX$_2$(arene)]$_2$ are combined together with an additive phosphorous ligand to form the catalyst system of the invention. The latter catalyst precursor, [RuX$_2$(arene)]$_2$, is especially preferred: arene indicates an aromatic hydrocarbon selected from the group consisting of benzene and alkyl-substituted benzene, such as p-cymene, mesitylene and hexamethylbenzene, and X is preferably univalent anion, preferably halide, especially chloride.

[RuX$_2$(arene)]$_2$ dimers that are used as catalyst precursor according to the invention are commercially available, or can be prepared by methods known in the art, by the reaction of RuCl$_3$.3H$_2$O with the corresponding diene, for example, α-phellandrene or 1,3-cyclohexadiene to form [RuCl$_2$(cymene)]$_2$ and [RuCl$_2$(benzene)]$_2$, respectively, in aqueous ethanol. The product is isolated in a solid form; the chloride may be displaced by other anions in water, in the presence of suitable halide salts. An illustrative procedure is given in the experimental section below, showing the synthesis of [RuCl$_2$(cymene)]$_2$. Other useful procedures are described, for example, by Zelonka et al. [Canadian journal of Chemistry, Vol. 50, p. 3063-3073 (1972)].

Thus, [RuX$_2$(arene)]$_2$ for use as a catalyst precursor according to the invention may be selected from the group consisting of [RuX$_2$(cymene)]$_2$; [RuX$_2$ (benzene)]$_2$; and [RuX$_2$(hexamethylbenzene)]$_2$. [RuX$_2$(cymene)]$_2$ is especially preferred on account of its high solubility in the organic solvents that are used in the process.

Additive phosphorous ligands that can be combined with the catalyst precursor may be selected from the group consisting of 1,1-bis(diphenylphosphino)methane [CH$_2$(PPh)$_2$; abbreviated "dppm" ]; 1,3 bis(diphenylphosphinomethyl)benzene; triphenylphosphine (P(Ph)$_3$); tetraphos (PP3). Additive ligands which do not contain phosphorous may also be used, such as (1S,2S)-p-Tosyl-1,2-diphenylethylenediamine (tsdpen).

There exist various methods to combine a catalyst precursor and an additive ligand and activate the catalyst system, that is, generate the reduced, catalytically active form.

According to a first variant, the catalyst system is activated in situ. The in-situ activation is achieved upon combining together the catalyst precursor and an additive phosphorous ligand in the reaction vessel where the dehydrogenation reaction of $MHCO_2$ takes place. The formate—owing to its reductive properties—is capable of producing the catalytically active form. That is, $MHCO_2$ functions not only as the hydrogen carrier, but also as a reducing agent for activating the catalyst system in situ. Different ways of adding the reagents to the reaction vessel exist. For example, a solution of the phosphorous ligand in a suitable organic solvent is first prepared and maintained at the desired temperature (e.g., 40-100° C.) for a period of time of 5-90 minutes, followed by the successive addition of aqueous $MHCO_2$ and catalyst precursor, e.g., [RuX$_2$(arene)]$_2$ complex, in any desired order (i.e., first the aqueous formate and then the ruthenium complex, or the reverse order). Preferably, [RuX$_2$(arene)] complex is the last added reagent. Another way is to stir the phosphorous ligand together with the [RuX$_2$(arene)]$_2$ complex in a suitable organic solvent under heating, for example, for a period of time of 5-90 minutes, and then combine the resultant solution with the aqueous $MHCO_2$. That is, an aqueous $MHCO_2$ stream and an organic stream that contains the catalyst precursor {for example, $[RuX_2(arene)]_2$} and the phosphorous ligand are fed separately to the reaction vessel, whereby the catalyst system is reduced to generate the catalytically active form, following which the dehydrogenation reaction proceeds and $MHCO_2$ is decomposed to release hydrogen.

According to a second variant, the catalyst system is activated ex-situ. The ex-situ activation is achieved by combining in an organic solution the catalyst precursor and the additive phosphorous ligand in the presence of a reducing agent to form the catalytically active form, and supplying said organic solution to the reaction vessel to decompose formate. That is, the catalyst system is brought to its catalytically active form in advance, in an organic solution, which may be stored if desired, and the catalyst-containing organic solution is subsequently put to use for decomposing the aqueous formate. To prepare the catalyst-containing organic solution in advance, the catalyst precursor and the phosphorous ligand are stirred in an organic solvent (that is, the one used for the dehydrogenation reaction; or in a mixture of solvents, as described in detail below) in the presence of a reducing agent under heating at about 40 to 100° C. for a period of time, say, of about 5 min to 24 hours, which period of time is sufficient for accomplishing the activation of the catalyst. The reagents may be added to the organic solution at any order as explained above for the first variant. The experimental results reported below indicate that the resultant active catalyst-containing organic solution is fairly stable, e.g., up to several months. The solution can be stored until use and introduced to the reaction vessel where the dehydrogenation reaction of $MHCO_2$ takes place. For example, according to this variant of the invention, aqueous $MHCO_2$ stream and an organic stream which contains the catalyst system in the catalytically active form are fed separately to the reaction vessel.

According to the ex-situ activation variant of the invention, the catalyst system may undergo activation in an organic solvent with the aid of various reducing agents, which are preferably provided in an aqueous form, such as aqueous formate, aqueous formic acid, aqueous hydrides (e.g., aqueous $NaBH_4$), aqueous citrate or citric acid. A reaction vessel is charged with an organic solvent or a mixture of organic solvents in which the phosphorous ligand is dissolved, followed by the addition of the aqueous reductant and the catalyst precursor under the conditions set forth above. The catalyst-containing organic phase is separated from the aqueous phase after a few minutes, and stored under inert gas atmosphere until use.

According to a third variant, the reaction product of the catalyst precursor and an additive phosphorous ligand is prepared and recovered in a solid form. For example, $[RuX_2(arene)]_2$ dimers react with phosphorous ligands, such as the aforementioned dppm, to form the $RuX_2(arene)L$ complex, where L indicates the phosphorous ligand. The complex formation reaction may take place in a solvent such as acetonitrile. The $RuX_2(arene)L$ complex is then collected by means of the techniques illustrated by Zelonka (supra), and purified by recrystallization. On dissolving the so-formed $RuX_2(arene)L$ catalyst in an organic solvent that is suitable for the dehydrogenation reaction as explained below, a catalyst solution is formed, which could be fed to the reaction vessel. The $RuX_2(arene)L$ may also be added to the reaction vessel in a solid form.

The organic solvent of choice is a key feature of the invention. The metal catalyst is dissolved in one or more organic solvent(s), characterized in that said organic solvent(s) comprise at least one solvent which is water-immiscible. In the context of the present invention, a solvent is considered water immiscible if its solubility at 25° C. is less than 25 g per 100 g water, for example, less than 10 g, e.g., less than 5 g and even less than 1 g per 100 g water.

In some embodiments of the invention, boiling point of the solvent is above 70° C. The solvent(s) is preferably devoid of reducing capacity towards the ruthenium-containing complex. To determine that a specific solvent lacks reducing properties, spectroscopic methods may be used, for example, to check if one or more characteristic absorbance peak assigned to the active form of the complex vanishes on contacting the complex with the solvent under consideration. For example, we have examined the visible spectra of a $0.25 \cdot 10^{-3}M$ solution of $[RuX_2(arene)]_2$ in different organic solvents at 60° C. as a function of time. The results indicate that the complex is stable in diethyl carbonate, one of the solvents of choices according to the invention: no significant change was observed in the intensity of the characteristic peak at about 650-670 nm over a period of several minutes.

More specifically, the water immiscible solvent (sometimes named herein "the first organic solvent") is preferably selected from the group consisting of aliphatic and cyclic hydrocarbons, aromatic hydrocarbons, halogenated hydrocarbons, esters, ketones, ethers, higher alkanols and carbonate solvents.

Aliphatic hydrocarbons include linear or branched alkanes and alkenes, for example, C6-C10 alkanes and alkenes, such as hexane, heptane and 2,2,4-trimethylpentane, and cyclic hydrocarbons, which encompass cycloalkanes and cycloalkenes such as cyclohexane, cyclohexene and alkyl-substituted cyclohexane, e.g., methylcyclohexane.

Aromatic hydrocarbons include alkyl-substituted benzene such as toluene, xylene, cymene and mesitylene.

Halogenated hydrocarbons include halogen-substituted aliphatic hydrocarbons, e.g., halogenated C1-C3 alkanes and alkenes (especially halogenated ethane and ethylene compounds, namely, $C_2H_kX_m$ wherein X is independently Cl or Br, $m \geq 1$ and $k+m=4$ or 6, such as 1,2 dichloroethane, 1,1,2-trichloroethane, trichloroethylene and tetrachloroethylene) and also halogen-substituted cyclic hydrocarbons and halogen-substituted aromatic hydrocarbons, e.g., benzene ring substituted with one or more halogen atoms. Mixed halogenated solvents, e.g., carrying both chlorine and bromine atoms, are also within the scope of the invention.

The first organic solvent may also be selected from the group consisting of water immiscible esters (e.g., ethyl acetate and butyl acetate), water immiscible ethers (e.g., anisole) water immiscible ketones (e.g., methyl ethyl ketone) and water immiscible alcohols (alkanols), e.g., alcohols having not less than 6 carbon atoms, such as 1-hexanol, 2-octanol, and 3,5,5-trimethyl-1-hexanol.

Another class of water immiscible solvents consist of liquids having the formula $(R_1)_n$—X—C(O)—X—$(R_2)_n$, where X indicates oxygen, $R_1$ and $R_2$, which may be the same or different, are C1-C3 alkyl groups and n is 1. For example, diethyl carbonate (X is O, n is 1, $R_1$ and $R_2$ are each —$C_2H_5$) and dimethyl carbonate (X is O, n is 1, $R_1$ and $R_2$ are each —$CH_3$) are suitable for use in the invention. The experimental results reported below indicate that a water immiscible carbonate solvent, diethyl carbonate, is especially useful, providing an easily manageable reaction.

In some embodiments of the invention, the catalyst system is dissolved in a single organic solvent, in which case the solvent of choice may be selected from the group consisting of halogenated hydrocarbons (as specified above), water immiscible esters (e.g., butyl acetate), water immiscible alcohols (alkanols) having not less than 6 carbon atoms (e.g., 1-hexanol and 2-octanol).

In other embodiments of the invention, the catalyst system is dissolved in a mixture of solvents which contains at least a first solvent that is a water-immiscible solvent as described above, and at least a second solvent, which is a polar, preferably protic, solvent. For example, a polar solvent which is suitable for use as the second solvent has relative polarity index above 0.5, for example, from 0.5 to 0.95, more specifically from 0.5 to 0.75, (Christian Reichardt, *Solvents and Solvent Effects in Organic Chemistry*, Wiley-VCH Publishers, 3rd ed., 2003). It should be noted that the second solvent may be either water-immiscible or water-miscible. Water-miscible solvents may be screened by measuring their solubility in ~16M $KHCO_2$ solution at 40° C. Experimental work conducted in support of this invention shows that the solubility of some water-miscible solvents in ~16M $KHCO_2$ aqueous solution at 40° C. decreases to less than 20%, or even less than 10%, compared with their solubility in water. Water-miscible solvents showing such a decrease in solubility, that is, solvents forming an essentially separate phase when added to 16M $KHCO_2$ solution may be used. The boiling point of the second solvent is preferably above 70° C. More preferably, the polar protic solvent is selected from the group consisting of C2-C6 alkanols (alkanols with two, three, four, five or six carbon atoms, either linear, branched or cyclic). Especially preferred are C2-C5 alkanols, e.g., ethanol, n-butanol or n-pentanol.

The volume ratio between the first organic solvent and the second organic solvent is preferably from 20:1 to 1:20, more preferably from 10:1 to 1:10, and even more preferably from 5:1 to 1:5. Hereinafter the first and second solvents are sometimes designated $S_1$ and $S_2$, and their volumes in the reaction mixture are designated $VS_1$ and $VS_2$, respectively. For example, when the second solvent is ethanol, then the predominant solvent is generally the first solvent, that is, the ratio $VS_1:VS_2$ is in the range from 5:1 to 1:1. When the second solvent is n-butanol, then the two solvents are used in roughly equal volumes, that is, the ratio $VS_1:VS_2$ is in the range from 2:1 to 1:2. When the second solvent is n-pentanol, then the predominant solvent is the second solvent, that is, the ratio $VS_1:VS_2$ is in the range from 1:5 to 1:1. Illustrative ratios for various pairs of the solvents are tabulated in Tables A-C below:

TABLE A

| $S_1$ | $S_2$ | Volume ratio |
| --- | --- | --- |
| Aliphatic hydrocarbons | ethanol | 4:6 to 6:4 (~5:5) |
| Aromatic hydrocarbons | ethanol | 4:6 to 6:4 (~5:5) |
| Halogenated hydrocarbons | ethanol | 8:3 to 6:3 (~7:3) |
| Esters, ethers, ketones, C6-C10 alkanol | ethanol | 4:2 to 1:1 (~3:2) |
| Carbonate | ethanol | 6:1 to 4:1 (~5:1) |

TABLE B

| First solvent | $S_2$ | Volume ratio |
| --- | --- | --- |
| Aliphatic hydrocarbons | n-butanol | 3:6 to 5:6 (~4:6) |
| Aromatic hydrocarbons | n-butanol | 3:6 to 5:6 (~4:6) |
| Halogenated hydrocarbons | n-butanol | 4:6 to 6:4 (~5:5) |
| Esters, ethers, ketones, C6-C10 alkanol | n-butanol | 4:6 to 6:4 (~5:5) |
| Carbonate | n-butanol | 8:3 to 6:3 (~7:3) |

TABLE C

| First solvent | $S_2$ | Volume ratio |
| --- | --- | --- |
| Aliphatic hydrocarbons | n-pentanol | 2:7 to 4:7 (~3:7) |
| Aromatic hydrocarbons | n-pentanol | 2:7 to 4:7 (~3:7) |
| Halogenated hydrocarbons | n-pentanol | 1:3 to 3:3 (~2:3) |
| Esters, ethers, ketones, C6-C10 alkanol | n-pentanol | 1:3 to 3:3 (~2:3) |
| Carbonate | n-pentanol | 2:1 to 1:2 (~1:1) |

The aqueous formate solution and the organic solvent(s) are combined in a volume ratio within the range from 1:50 to 50:1, preferably 1:10 to 10:1. The molar ratios between the components of the catalyst system and the formate, that is, {catalyst precursor:phosphorous ligand:$MHCO_2$} are preferably within the range from 1:2:100 to 1:20:10000. Hereinafter the mole ratio between the catalyst precursor and the ligand is sometimes indicated by the notation Cat:L, or specifically Ru:L in the case where the catalyst is ruthenium. Thus, Ru:L preferably lies in the range from 1:2 to 1:6. Mechanical stirring (high sheer) or homogenizer may be employed with rpm above 500, e.g., above 1,000 or above 3,000.

A surfactant and/or a phase transfer catalyst may be added to the reaction mixture, that is, either to the organic phase (for example, at a weight percentage from 0.5 to 15% of the overall organic phase) and/or to the aqueous phase (for example, at a weight percentage from 0.5 to 15% of the overall aqueous phase). A surfactant/phase transfer catalyst may be a salt having nitrogen-containing cation, e.g., a quaternary ammonium cation, namely, $N^+R_1R_2R_3R_4$ wherein each of $R_1$, $R_2$, $R_3$ and $R_4$ is independently C1-C18 alkyl group (preferably C1-C12 alkyl, which may be either linear or branched, most preferably linear) and a counter anion, e.g., halide anion such as chloride or bromide. Quaternary ammonium salts of the formula $N+CH_3[(CH_2)_kCH_3]_3$ Hal-, wherein k is at least 5, e.g., between 5 to 9, and Hal is chloride or bromide may be used. As an example of this sub-class of quaternary ammonium salts, methyltrioctyl ammonium halide can be mentioned (k=7), which is commercially available in the form of its chloride salt as Aliquat 336. Other examples include tetrabutyl ammonium chloride (TBACl).

Nonionic surfactants may also be used, such as polyoxyethylene fatty acid esters, e.g., polyoxyethylene sorbitan monooleate (Tween® 80) and Sorbitane monooleate, sorbitan oleate (span 80).

Without wishing to be bound by theory, it is assumed that the active catalyst is in the form of a cluster of nanoparticles. Indeed, TEM analysis at the end of some reactions detected the presence of nanoparticles of 0.5 at 2 nm size. In addition UV-vis spectrophotometry shows the immediate extinction of all peaks assigned to the complex precursor after addition of the formate salt at the catalytic organic solution, indicating the reduction of the catalyst precursor.

It should be noted that the dehydrogenation reaction described above, may lead to the formation of bicarbonate in a soluble form within the aqueous phase, or to the precipitation of bicarbonate within the aqueous phase. Both variants are contemplated by the invention.

Figure 2:
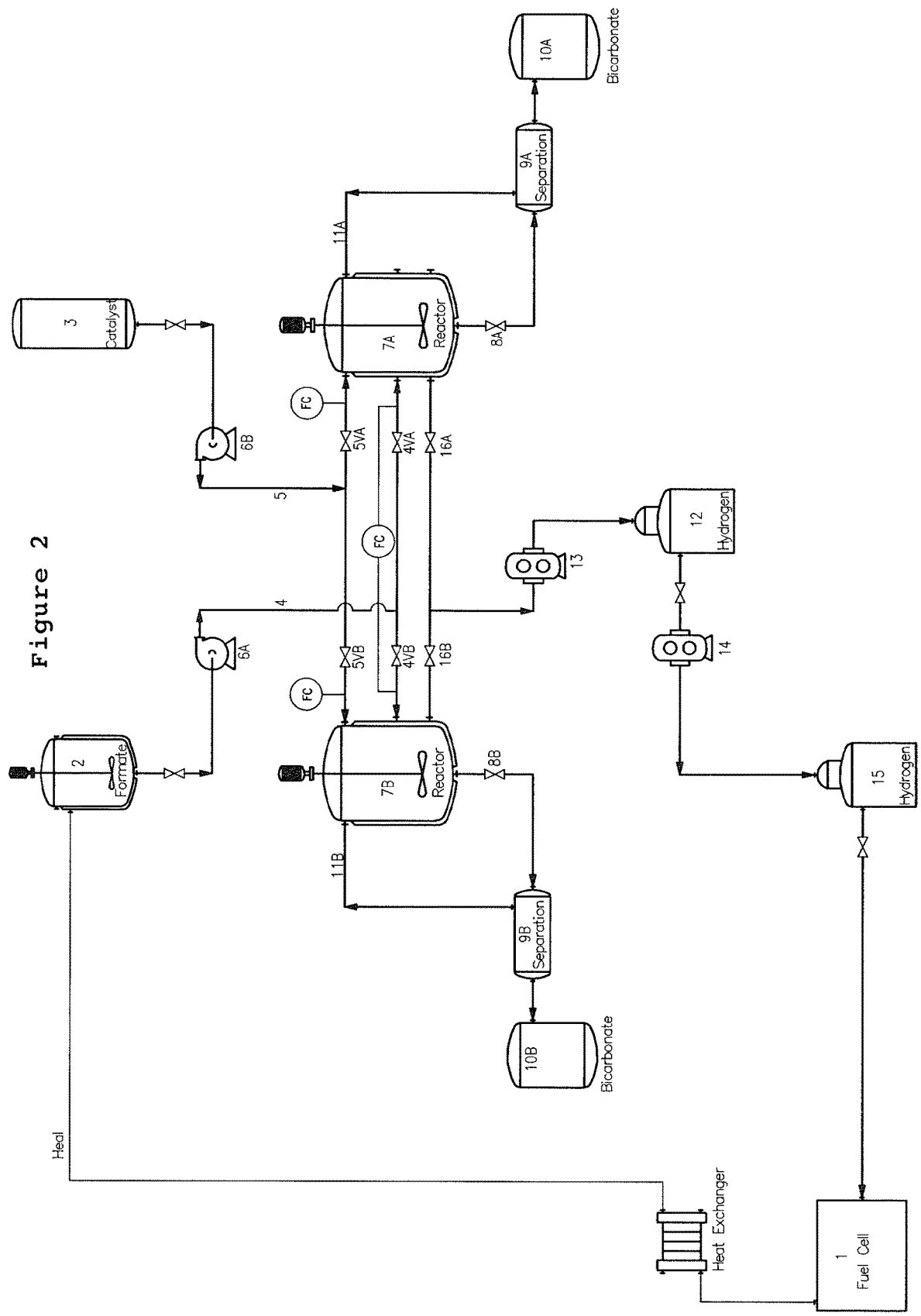
FIG. 2 schematically illustrates an apparatus for carrying out the dehydrogenation reaction.

Turning now to another aspect, FIG. 2 illustrates an apparatus suitable for running a dehydrogenation reaction leading to formation of bicarbonate slurry. More specifically, FIG. 2 shows a power system comprising at least one fuel cell (1) and a hydrogen-generating unit for delivering hydrogen to the anodic compartment of the fuel cell. The apparatus is designed to allow the decomposition of a concentrated aqueous $MHCO_2$ salt in the presence of a catalyst in a solvent, or a mixture of solvents, to release hydrogen and form a bicarbonate slurry ($MHCO_3$), and also to allow recovery of catalyst-free $MHCO_3$ solid suitable for storage, and recycle of the liquid component of the reaction mixture (consisting of aqueous $MHCO_2$ and the catalyst-containing solution), from the separation system to the reaction system. It should be noted that the dehydrogenation reaction may run either in a batch, semi-batch or continuous mode of operation, as described below.

The hydrogen-generating unit comprises a tank (2) where the aqueous $MHCO_2$ solution is kept under heating and stirring. The catalyst solution is held in a separate tank (3). For example, the organic solvent, the phosphorous ligand and the metal source, such as $[RuX_2(arene)]_2$ complex, may be combined in tank (3) under heating and stirring. However, it is also possible to hold each of the catalyst's components in a different tank (e.g., (3) and (3')—not shown)) and feed the individual components separately to the reactor. Heating is supplied to tanks (2) and (3), to keep a temperature in the range from 20 to 80° C., preferably 30 to 80° C. Heat released by the fuel cell (1) may be used to heat storage tank (2), (3) or both, and also other parts of the apparatus, as required.

Tanks (2) and (3) are connected by means of feed lines (4) and (5) to a first reactor (7A). In the preferred embodiment shown in FIG. 2, feed lines (4) and (5) split such that tanks (2) and (3) may be in fluid communication with a second reactor (7B). With the aid of an array of valves (4Va), (4Vb), (5Va) and (5Vb), the system may switch periodically from one reactor to another (7A↔7B), i.e., the streams of reactants may be directed from tanks (2) and (3), with the aid of pumps (6A) and (6B), respectively, either to reactor (7A) or (7B), as described in more detail below. As to the reactor's design, it is preferably a stirred tank reactor equipped with conventional heating and cooling means, e.g., external jacket or internal coil.

Reactors (7A) and (7B) are provided with discharge lines (8A) and (8B), having downstream processing devices including separation units (9A) and (9B), coupled to storage containers (10A) and (10B), respectively. Separation units (9A) and (9B) include solid/liquid separation means, e.g., suitable filters and centrifuges, but also other separation means, such as hydro cyclone, or combination thereof, allowing either batch or continuous separation. For example, if the reactor is intended to operate in a batch mode, then nutsche filter or basket filter can be incorporated into the separation units. If the reactor is intended to operate in a continuous mode, then drum filter may be employed to achieve the solid/liquid separation. In addition to solid/liquid separation, separation units (9A) and (9B) may also carry out liquid/liquid separation, i.e., the liquid component of the reaction mixture can be separated into formate-containing aqueous phase and catalyst-containing water-immiscible organic phase. To this end, three phase bowl centrifuge or three phase decanter centrifuge may be used, allowing simultaneous solid/liquid and liquid/liquid separations. Lines (11A) and (11B) are used to recycle streams of the liquid component(s) of the reaction mixture from separation unit (9A) and (9B) to reactors (7A) and (7B), respectively.

Reactors (7A) and (7B) are further connected to one or more hydrogen-collecting cylinders or bottles (12), to collect the hydrogen evolving in the reactors. It should be noted that a series of such cylinders (12, 15) may be positioned along the line connecting the reactors to the fuel cell (1), such that the hydrogen gas produced may be increasingly compressed (13, 14) to achieve a working pressure suitable for meeting the demand at fuel cell (1), e.g., 1-20 atm.

Figure 3:
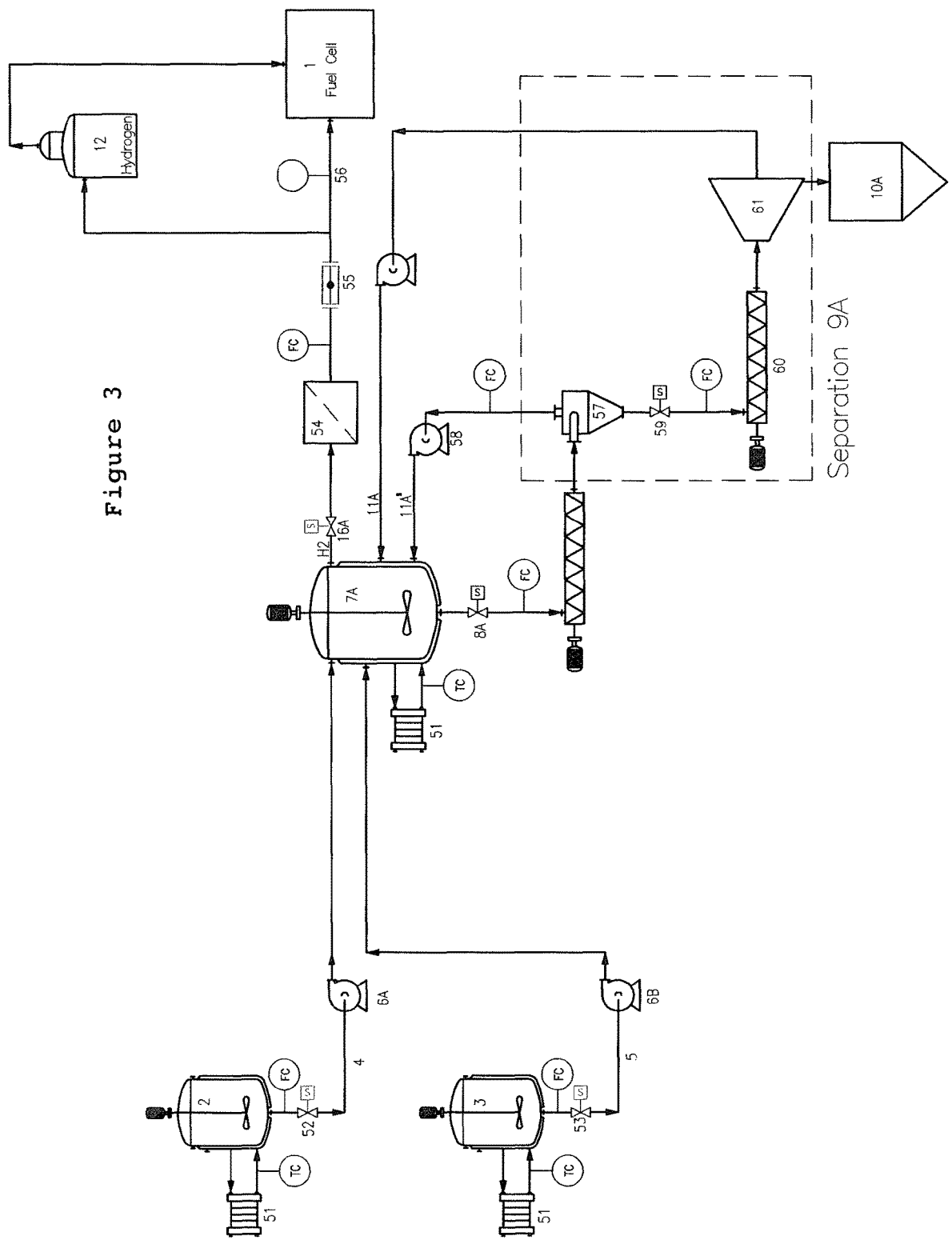
FIG. 3 schematically illustrates an apparatus for carrying out the dehydrogenation reaction in a continuous mode of operation, where the separation of the reaction mixture into its components is achieved with the aid of hydro cyclone and a centrifugal separator.
Figure 4:
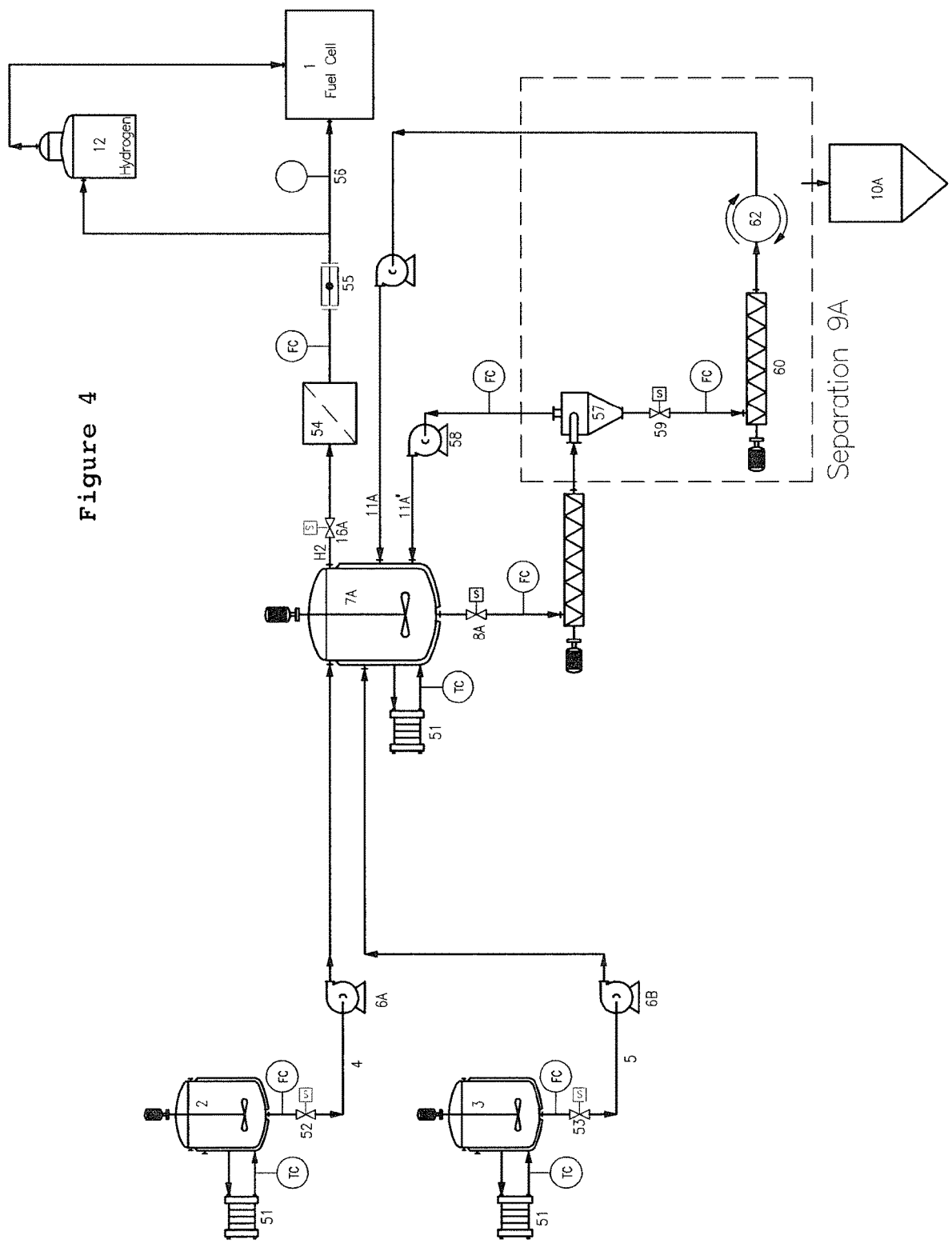
FIG. 4 schematically illustrates an apparatus for carrying out the dehydrogenation reaction in a continuous mode of operation, where the separation of the reaction mixture into its components is achieved with the aid of hydro cyclone and a drum filter.
Figure 5:
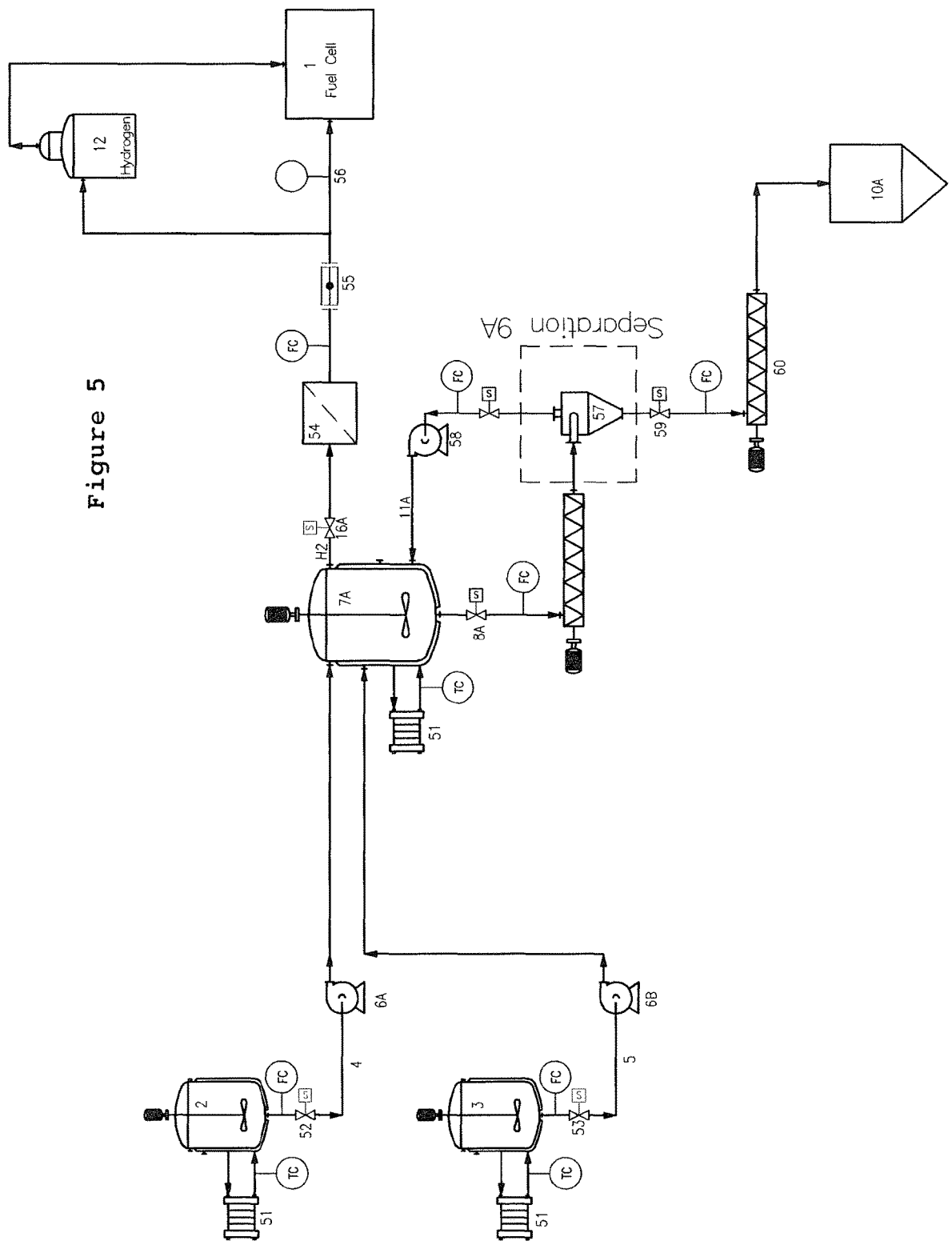
FIG. 5 schematically illustrates an apparatus for carrying out the dehydrogenation reaction in a continuous mode of operation, where the separation of the reaction mixture into its components is achieved with the aid of hydro cyclone alone.

It may be appreciated that the hydrogen-generating unit shown in FIG. 2 consists in fact of two independent sub-units, each of which is capable of hydrogen production, which sub-units are interchangeable with one another. However, the set-up illustrated in FIG. 2 is not mandatory, and the apparatus of the invention may include a single reactor coupled to a separation system generating a product stream and a recyclable stream, which can be operated in continuous mode, as shown in FIGS. 3, 4 and 5.

Accordingly, the invention provides a power system comprising at least one fuel cell (1) and a hydrogen-generating unit for delivering hydrogen to the fuel cell, wherein said hydrogen-generating unit comprises a tank (2) for holding an aqueous $MHCO_2$ solution, a tank (3) for holding an organic solution having one or more catalyst components, said tanks (2) and (3) being connected by means of feed lines (4) and (5) to at least one reactor (7A) provided with a discharge line (8A), having downstream processing devices including separation units (9A) coupled to a storage container (10A), wherein recycle line (11A) existing separation unit (9A) is connected to an inlet opening in said reactor (7A), to recycle liquid stream from said separation unit to said reactor (7A), and wherein said reactor (7A) is optionally provided with one or more hydrogen-collecting means (12) in fluid communication with said fuel cell (1).

The invention also provides a power system comprising at least one fuel cell (1) and a hydrogen-generating unit for delivering hydrogen to the fuel cell, wherein said hydrogen-generating unit comprises a tank (2) for holding an aqueous $MHCO_2$ solution, a tank (3) for holding an organic solution having one or more catalyst components, said tanks (2) and (3) being connected by means of feed lines (4) and (5) to at least a first reactor (7A) and a second reactor (7B), each of which is provided with discharge lines (8A) and (8B), having downstream processing devices including separation units (9A) and (9B) coupled to storage containers (10A) and (10B), respectively, wherein recycle lines (11A), (11B) existing separation units (9A) and (9B), respectively, are connected to inlet openings in said reactors (7A) and (7B), to recycle liquid streams from said separation units to said reactors, and wherein said reactors (7A) and (7B) are provided with one or more hydrogen-collecting means (12) in fluid communication with said fuel cell (1). An array of valves is further incorporated into the apparatus, to control the flow of feed streams to either reactor (7A) or (7B).

Turning now to the operation of the apparatus in a batch mode, the operation may start with pair of valves (4VA, 5VA) being in an open state, and pair of valves (4VB, 5VB) being closed, or vice versa. $MHCO_2$ solution and catalyst organic solution held in tanks (2) and (3), respectively, flow to reactor (7A), where the dehydrogenation reaction takes place at a temperature in the range from 20 to 85° C., preferably 30 to 80° C. Hydrogen evolution starts practically instantaneously under normal pressure, with bicarbonate being increasingly formed in the aqueous phase. The reaction mixture is stirred vigorously.

In response to solid bicarbonate in reactor (7A) exceeding a predetermined threshold level (this may be indicated by an appropriate signal), valves (4VA, 5VA) are closed and valves (4VB, 5VB) are opened, such that the streams of reactants are caused flow from hold tanks (2) and (3) to reactor (7B), which becomes the 'active' reactor, to ensure continuous hydrogen release and supply. The reaction mixture is discharged from reactor (7A), and allowed to flow through discharge line (8A) into a separation unit (9A), where the reaction mixture is separated into a solid bicarbonate component and a liquid component, consisting of formate-containing aqueous phase and catalyst-containing organic phase. The solid is stored in container (10A), whereas the liquid is recycled from the separation unit to reactor (7A). The liquid may undergo separation into aqueous and water-immiscible organic phases.

During the time that reactor (7A) is inactive, hydrogen production is guaranteed with the aid of reactor (7B), with valves (16A) and (16B) being adjusted accordingly. In this way, the dehydrogenation reaction takes place alternately in reactors (7A) and (7B).

Alternatively, the dehydrogenation reaction can be carried out under continuous mode of operation. Reference is made to FIG. 2; only one of the sub-units A or B is used. However, if the continuous reaction running in reactor (7A) is interrupted for some reason, then the other reactor (7B) would be allowed to operate. Streams of concentrated aqueous MHCO$_2$ solution and catalyst solution are continuously fed from tanks (2) and (3), respectively, to reactor (7A), which may be, for example, stirred tank reactor equipped with external jacket or internal coil, where the reaction takes place under stirring and heating. Hydrogen gas evolving in the reactor flows continuously through valve (16), along the same path described above, such that compressed hydrogen is supplied to the fuel cell (1).

The reaction mixture is continuously discharged from the outlet of reactor (7A). The reaction mixture, consisting of solid bicarbonate suspended in aqueous MHCO$_2$ solution and catalyst-containing organic solution is subjected to a continuous solid/liquid separation in separation system (9A), to isolate solid bicarbonate (stored in container (10A)) and a liquid consisting of aqueous and organic phases, which is recycled through line (11A) to reactor (7A). To achieve continuous solid/liquid separation, a drum filter may be used. It should be noted that when the catalyst-containing organic solution is water-immiscible, then the liquid phase may undergo separation into aqueous formate solution and catalyst-containing organic phase, for example, concurrently with the solid/liquid separation (e.g., with the aid of three phase decanter centrifuge or three phase decanter centrifuge). The amounts and rates of flow of fresh and recycled reactants and the temperature of the reaction mixture may be adjusted to produce hydrogen at a rate sufficient to meet the demand at the site of the intended use.

As pointed out above, the set-up illustrated in FIG. 2 is not mandatory, and the apparatus of the invention may include a single reactor coupled to a separation system generating a product stream and a recycle stream, which can be operated in continuous mode, as shown in FIGS. 3, 4 and 5.

Regarding FIG. 3, potassium formate solution is kept in vessel (2). Potassium formate solution temperature is controlled by temperature controller (TC) and heat exchanger (51). Catalyst solution is kept in Vessel (3). Catalyst solution temperature is controlled by temperature controller (TC) and heat exchanger (51).

Potassium formate solution is fed through feed line (4) provided with valve (52) and pump (6A) to reactor (7A). Potassium formate solution feed rate is controlled by flow controller (FC).

Catalyst solution is fed through feed line (5) provided with valve (53) and pump (6B) to reactor (7A). Catalyst solution feed rate is controlled by flow controller (FC).

The temperature in reactor (7A) is controlled by temperature controller (TC) and heat exchanger (51). Reactor (7A) is a stirred reactor, equipped with high speed high shear blade or a high shear homogenizer or equipped with both type stirrers.

On feeding the potassium formate solution and the catalyst solution into the reactor (7A) and stirring the mixture in the reactor, the dehydrogenation reaction starts. The hydrogen (H$_2$) released flows out through valve (16A). Hydrogen flows through Hydrogen purifier (54). Hydrogen flow is controlled (FC) the flow is measured by flow meter (55) and pressure is measured by pressure gauge (56). The Hydrogen may be directed (12) to hydrogen-collecting cylinder and supplied to a fuel cell (1) generating electrical power.

Simultaneously potassium bicarbonate is formed; it precipitates and accumulates in the reactor (7A). At a predetermined conversion percentage, valve (8A) is opened and a pump starts pumping the content of reactor (7A) at a controlled flow rate (FC) through a separation unit (9A) comprising a hydro cyclone (57). The liquid stream generated consists of a clarified potassium formate solution and a catalyst solution. The liquid stream is fed back to reactor (7A) via line (11A) through flow regulated (FC) pump (58). The potassium bicarbonate slurry discharged from hydro cyclone (57) is fed through valve (59) and flow controlled (FC) pump (60) to a continuous centrifugal separator (61)—continuous basket centrifuge, decanter centrifuge, disc centrifuge or any other continuous centrifugal separation device. Potassium bicarbonate is discharged to vessel (10A). The potassium formate solution is directed back via line (11A') to reactor (7A).

During reaction and as long as hydrogen and electrical power are in demand, potassium formate continuously flows to reactor (7A) to maintain dehydrogenation reaction and separation cycle.

Regarding FIG. 4, the apparatus shown is generally similar to the apparatus of FIG. 3. However, separation unit (9A) is equipped with a drum filter (62) to allow the separation of the bicarbonate slurry discharged from hydro cyclone (57) into a solid phase collected in vessel (10A) and a liquid phase recycled via line (11A') to the reactor (7A).

Regarding FIG. 5, the apparatus shown is generally similar to the apparatuses of FIGS. 3 and 4. However, the separation unit consists of hydro cyclone (57), for receiving the effluent of reactor (7A). In this embodiment of the invention, the bicarbonate slurry that is discharged from hydro cyclone (57) is not treated to recover an aqueous phase therefrom.

Accordingly, the invention also provides a continuous process for generating hydrogen, comprising continuously feeding to the reaction vessel an aqueous MHCO$_2$ stream and an organic stream in which the metal-containing catalyst system is dissolved in the organic solvent(s), dehydrogenating said MHCO$_2$ in said reaction vessel, thereby releasing hydrogen and forming bicarbonate (MHCO$_3$) slurry, continuously discharging from said reaction vessel a reaction mixture consisting of solid bicarbonate and a liquid component, continuously separating the reaction mixture into solid and one or more liquid components, collecting said solid bicarbonate and recycling one or more liquid component(s) to said reactor.

In many applications, the power system comprising a fuel cell and a hydrogen-generating unit for supplying compressed hydrogen to the cell, as described above, is connected to a device for carrying out the reverse (hydrogenation) reaction, i.e., conversion of bicarbonate slurry back to formate solution. However, this is not always the case. For example, the device shown in any of FIGS. 2-5 can be mounted in a vehicle powered by a fuel cell. On arrival of the vehicle to a maintenance center, formate solution is loaded into tank (2) and the bicarbonate slurry is discharged from storage tanks (10A) and (10B) and subjected to hydrogenation reaction as described below, e.g., in the maintenance center or elsewhere.

Turning now to the hydrogenation reaction in more detail, as already mentioned above, the preferred catalytic system set forth above can be used to advance both the hydrogenation and dehydrogenation reactions. However, hydrogen storage, namely, reaction of bicarbonate slurry with hydrogen to yield a concentrated $MHCO_2$ solution, may also be achieved in the presence of solid catalysts, such as palladium on carbon, especially the Pd/C illustrated in PCT/IL2014/050965.

Pd/C catalyst with Pd loading in the range from 0.15 to 1.0 wt %, preferably 0.2 to 0.5 wt %, characterized in that at least a portion of the palladium is present on the support in the form of sub-nanometer particles (<1 nm), was found to be useful. The presence of the sub-nanometer Pd particles in the catalyst sample is indicated by Scanning Transmission Electron Microscopy with Energy Dispersive X-ray Spectroscopy (STEM-EDS), identifying palladium-containing regions in the carbon support, which regions consist of invisible Pd particles (i.e., below TEM resolution and therefore too small to be visible in the TEM image). Additionally, Pd particles in the low nanometer range of size (from 1 nm to 20 nm, e.g., from 1 nm to 5 nm) are also present in the Pd/C catalyst; these particles are visible in TEM images.

Pd/C catalyst with the properties set forth above can be prepared by reduction of palladium salt (e.g., $Pd(NO_3)_2.2H_2O$) using a mild reducing agent (for example, potassium formate) over activated carbon. More specifically, the Pd/C catalyst is prepared by a process comprising dissolving in water a palladium salt, such as palladium (II) nitrate dihydrate, adding to the solution heat-treated activated carbon (preferably a form bearing acidic groups, such as C-3345 available from Sigma), stirring the so-formed mixture, reducing the $Pd^{2+}$ to $Pd^0$ under mild conditions (e.g., with the aid of formate, especially potassium formate, as a reducing agent), collecting a powder consisting of Pd/C, washing and drying same. An illustrative procedure is given below.

The invention provides a continuous process for storing hydrogen in the form an aqueous potassium formate carrier, through the hydrogenation reaction of potassium carbonate slurry with the aid of solid catalyst such as Pd/C mentioned above. The process comprises continuously feeding hydrogen and bicarbonate into a reactor charged with aqueous bicarbonate slurry and a solid catalyst, to form a reaction mixture consisting of bicarbonate and said catalyst suspended in aqueous formate solution, continuously separating in a solid/liquid separator said reaction mixture into solid and liquid phases, continuously recycling said solid phase from said separator to said reactor and collecting aqueous potassium formate solution. Regeneration of the catalyst is accomplished by treating the catalyst particles with an oxidizer in the presence of said solid bicarbonate.

An apparatus suitable for carrying out the process set forth above comprises a tank for holding $KHCO_3$ slurry and a hydrogen source ($H_2$ cylinder or an electrolysis cell for $H_2$ production), wherein said tank and said $H_2$ source are connected by feed lines to a stirred reactor provided with a solid/liquid separator, said separator having recycle line for delivering solid separated in said separator back to said reactor and a discharge line connected to at least one storage vessel for collecting an aqueous potassium formate solution generated, said apparatus preferably further comprises a feed line for introducing an oxidizer (e.g., a stream of air) to said reactor.

Figure 6:
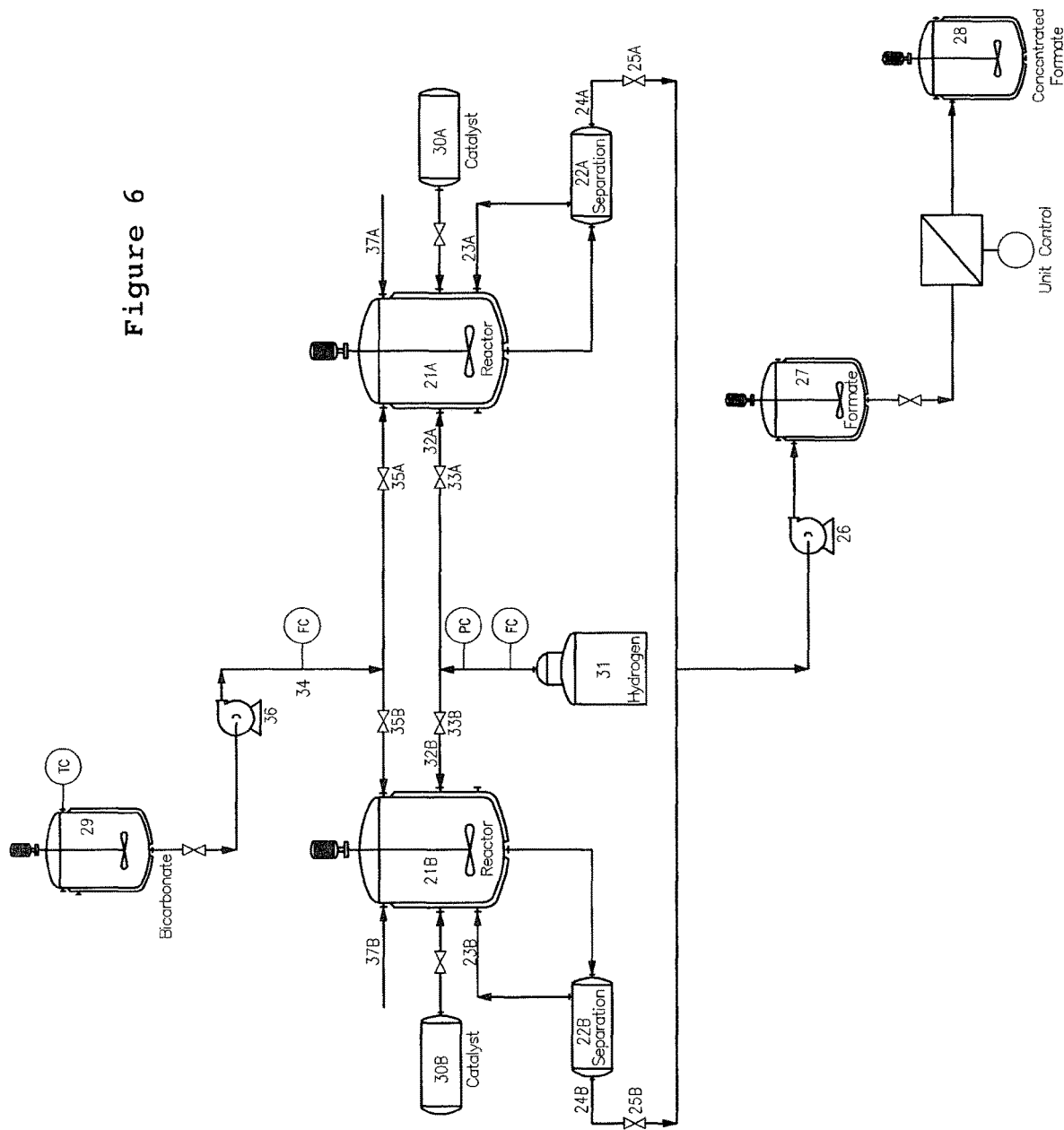
FIG. 6 schematically illustrates an apparatus for carrying out the hydrogenation reaction of the invention.

FIG. 6 illustrates a preferred apparatus for converting bicarbonate to a concentrated formate solution (of not less than 4M) by a reaction with hydrogen, with the aid of a solid catalyst, such as Pd/C. In the specific apparatus illustrated in FIG. 6, the hydrogenation reaction takes place alternately in reactors (21A) or (21B).

Reactors (21A) and (21B) may have a configuration of stirred gas liquid reactor. Reactors (21A) and (21B) discharge to separation systems (22A) and (22B), respectively, equipped with a solid/liquid separator, e.g., a filter, a centrifuge, a hydrocyclone, or a combination of such separators. Specific examples mentioned above in respect of the dehydrogenation apparatus of FIGS. 2-5 can be implemented also in the hydrogenation apparatus of FIG. 6.

Separation systems (22A) and (22B) are provided with recycle lines (23A) and (23B), to recycle a solid mixture consisting of unreacted bicarbonate starting material and solid catalyst particles from said separation units back to the respective reactors. The separation systems (22A) and (22B) are connected through discharge lines (24A) and (24B) (with valves (25A) and (25B), respectively) to a stirred tank (27) where the liquid product is collected, namely, the aqueous formate solution, driven by pump (26). The concentration of the aqueous formate solution collected in tank (27) may undergo adjustment (40), rarely dilution and frequently concentration, by injecting water or adding metered amounts of solid $MHCO_2$ salt via a dosing pump, respectively, to give $MHCO_2$ salt solution with a desired concentration (28), which in turn may release hydrogen on demand, as set out above.

The aqueous bicarbonate starting material, for example, in the form of bicarbonate slurry in aqueous formate with solid bicarbonate content from 50-90% by weight, is held in tank (29) under stirring, at a temperature of about 30 to 40° C. Pump (26) drives the starting material to the reactor through feed line (34), which 'splits' with the aid of valves (35A) and (35B), such that the bicarbonate starting material may be guided either to reactor (21A) or (21B).

Hydrogen required for the reaction is supplied from $H_2$ cylinder (31) or from an electrolyzer (not shown) through feed line (32A) or (32B), equipped with valves (33A) and (33B), respectively, to the 'active' reactor, either (21A) or (21B), respectively. Hydrogen supply to the reactor is controlled by a pressure regulator (36).

Catalyst required for the reaction may be held in one or more vessels (30A, 30B). As mentioned above, the catalyst is preferably Pd supported on carbon, either commercially available or prepared as shown in Preparation 2 below.

Feed lines (37A) and (37B) indicate incoming oxidizer streams (e.g., air streams) supplied to reactors (21A) and (21B) for catalyst regeneration, as explained below, and nitrogen streams for maintaining nitrogen blanket in the reactors (optional).

Accordingly, another aspect of the invention is an apparatus for storing hydrogen in an aqueous potassium formate carrier, through the hydrogenation reaction of potassium bicarbonate slurry, said apparatus comprises tank (29) for holding $KHCO_3$ slurry and hydrogen source (31), wherein said tank (29) is connected by feed lines (34A, 34B) to reactors (21A) and (21B), respectively, and said $H_2$ source (31) is connected by feed lines (32A, 32B) to said first and second reactors (21A) and (21B), respectively, with an array of valves (35A, 35B) (33A, 33B) for controlling the reactants feeds to either reactor (21A) or (21B), wherein at least one of said reactors (21A) and (21B), and preferably both, is provided with a solid/liquid separator (22A, 22B, respectively) with recycle lines (23A) and (23B) for delivering solid separated in said separators back to said reactors, and discharge lines (24A, 24B) connected to at least one storage vessel (27) for collecting an aqueous potassium formate solution. Preferably, the apparatus further comprises a feed line (37A, 37B) for introducing an oxidizer (e.g., a stream of air) to at least one of said reactors.

The operation of the apparatus shown in FIG. 6 in now explained in more detail. The continuous operation is started with reactor (21A) containing a reaction mixture consisting of bicarbonate suspended in an aqueous formate solution, with solid catalyst being also present. This initial reactor content may be kept under an atmosphere of an inert gas (nitrogen), but can also be kept with the presence of hydrogen (well below the pressure needed for the reaction). Hydrogen is continuously fed from an electrolysis cell (not shown) or cylinder (31); the hydrogenation reaction is conducted under pressure in the range from 2 to 15 atm, for example, from 4 to 10 atmospheres, at temperature in the range from 30 to 70° C., preferably from 3 to 9 atm and 30 to 50° C.

The effluent from the reactor is separated (22A) into a solid component (consisting of bicarbonate and catalyst particles), which is recycled (23A), and an aqueous component, which is the product, which is collected (27).

On completion of the reaction, a reaction mixture consisting of solid bicarbonate and solid catalyst suspended in an aqueous formate solution, is left in reactor (21A). The catalyst may be effectively regenerated by treating said mixture with a stream of air (37A) (following a purge step where inert gas, usually nitrogen, is used to displace hydrogen). However, if the activity of the catalyst drops too sharply and the production of formate should not be interrupted, it is possible to temporary direct feed streams to the second reactor (21B), loaded with a fresh catalyst. Reactor (21B) operates in a similar fashion as reactor (21A), i.e., it is coupled to a separator generating a recycle stream (23B) and a product stream. Catalyst regeneration may then take place in reactor (21A), as described above. To ultimately isolate the solid catalyst, the reaction mixture may be diluted with water to force bicarbonate dissolution followed by filtration of solid catalyst (Pd/C) particles.

Figure 7:
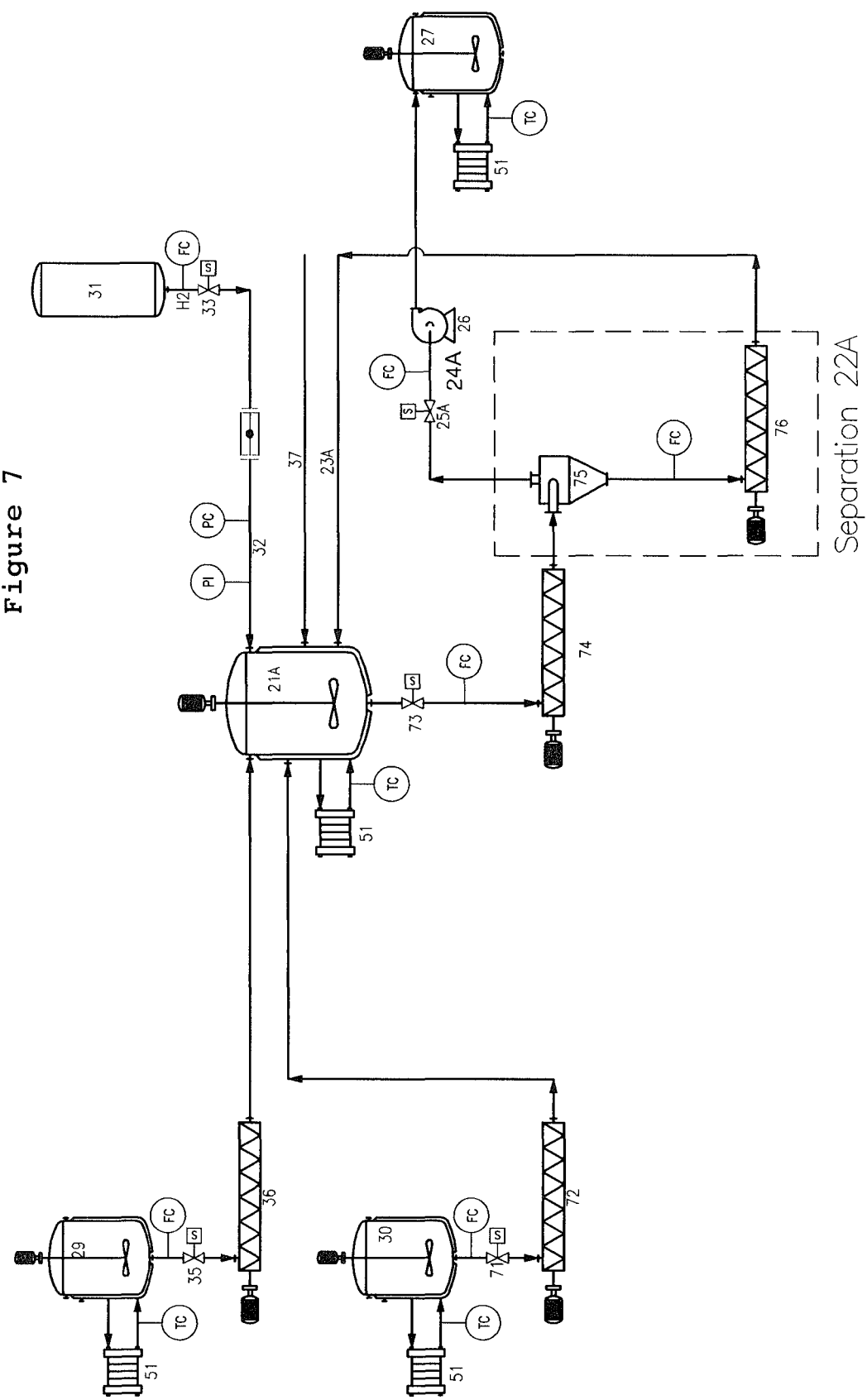
FIG. 7 schematically illustrates an apparatus for carrying out the hydrogenation reaction in a continuous mode of operation, employing hydro cyclone separation.

FIG. 7 shows an apparatus suitable for running the continuous hydrogenation of potassium bicarbonate based on a single hydrogenation reactor set-up. Potassium bicarbonate (solids) or potassium bicarbonate slurry—in water or in Potassium formate solution (up to 15.7M), is kept in vessel (29). Potassium bicarbonate vessel temperature is controlled by temperature controller (TC) and heat exchanger (51). Catalyst is kept in temperature controlled (TC) vessel (30) connected to a heat exchanger (51).

Potassium bicarbonate flows to the reactor (21A) through valve (35) and flow controlled (FC) pump (36). Catalyst flows to reactor (21A) through valve (71) and pump (72). Hydrogen (H$_2$) is produced in-situ or stored compressed (31) and flows to reactor (21A) via feed line (32), through valve (33). Hydrogen flow (FC) and pressure (PC) are controlled.

Once Potassium bicarbonate and catalyst are fed to reactor (21A) at a predetermined ratio, hydrogen flow reaches the predetermined pressure (3-20 bar) and temperature in the reactor is in the range of 20° C. to 70° C.—hydrogenation reaction starts, whereby potassium bicarbonate reacts with hydrogen to produce potassium formate solution. Hydrogen flows to the reactor (21A) to keep the reaction going on at the predetermined pressure. At a predetermined reaction conversion percentage (50%-85%), the reaction mixture start flowing through valve (73) and pumped by flow controlled (FC) pump (74) to a separation unit (22A), comprising hydro-cyclone (75). Slurry containing catalyst and potassium bicarbonate are driven by flow controlled (FC) pump (76) via line (23A) back to reactor (21A). The reaction product, namely, a clarified Potassium formate solution flows through valve (25) and is driven by flow controlled (FC) pump (26) along feed line (24A) to vessel (27). Vessel (27) is stirred and temperature controlled (TC) and connected to a heat exchanger (51).

Feed line (37) indicates incoming oxidizer streams (e.g., air streams) supplied to reactors (21A), to accomplish catalyst regeneration within the slurry, when needed.

Figure 8:
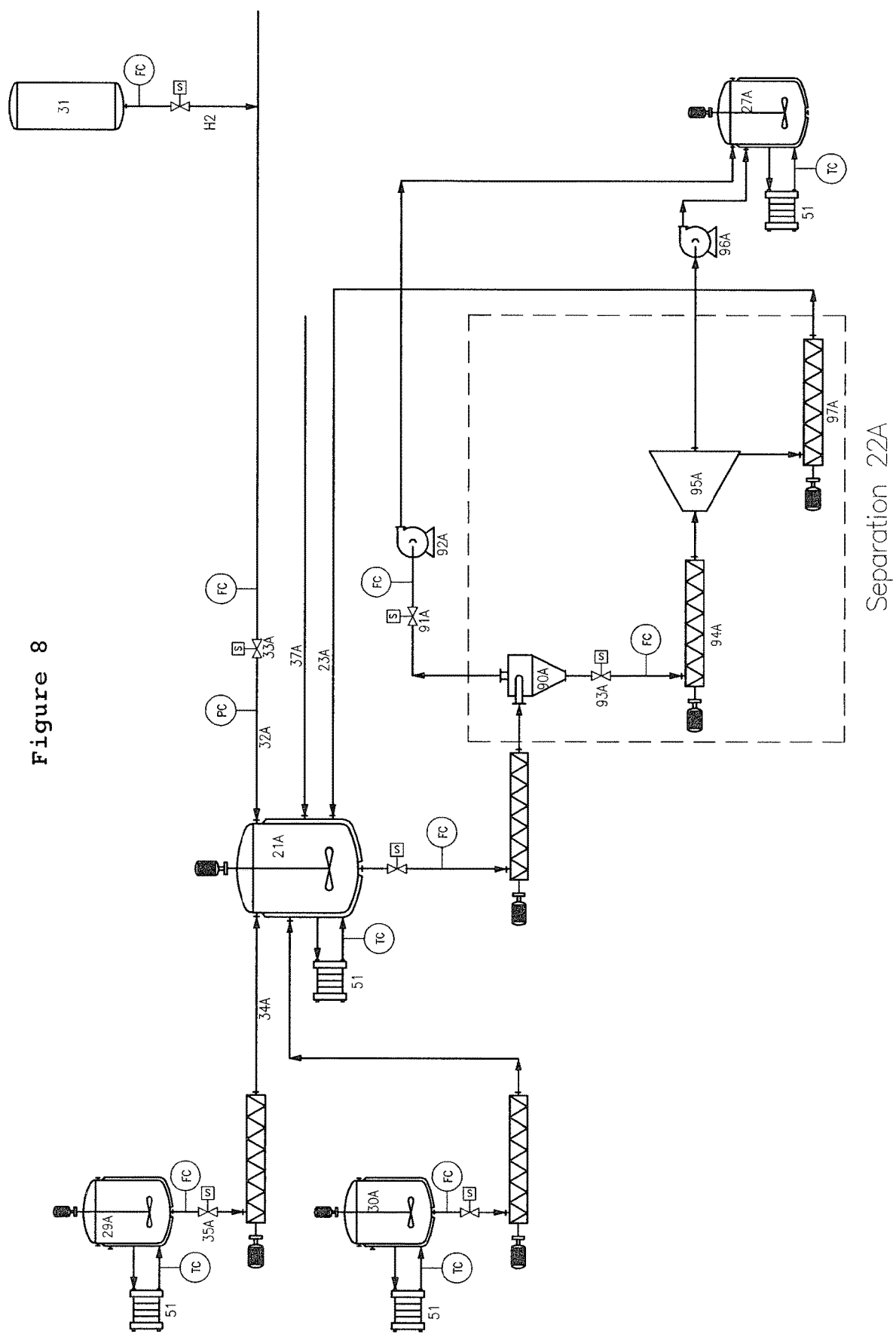
FIG. 8 illustrates an apparatus for carrying out the hydrogenation reaction in a batch or continuous mode of operation, with the aid of hydro cyclone separation and filtration/centrifugal separation.
Figure 8:
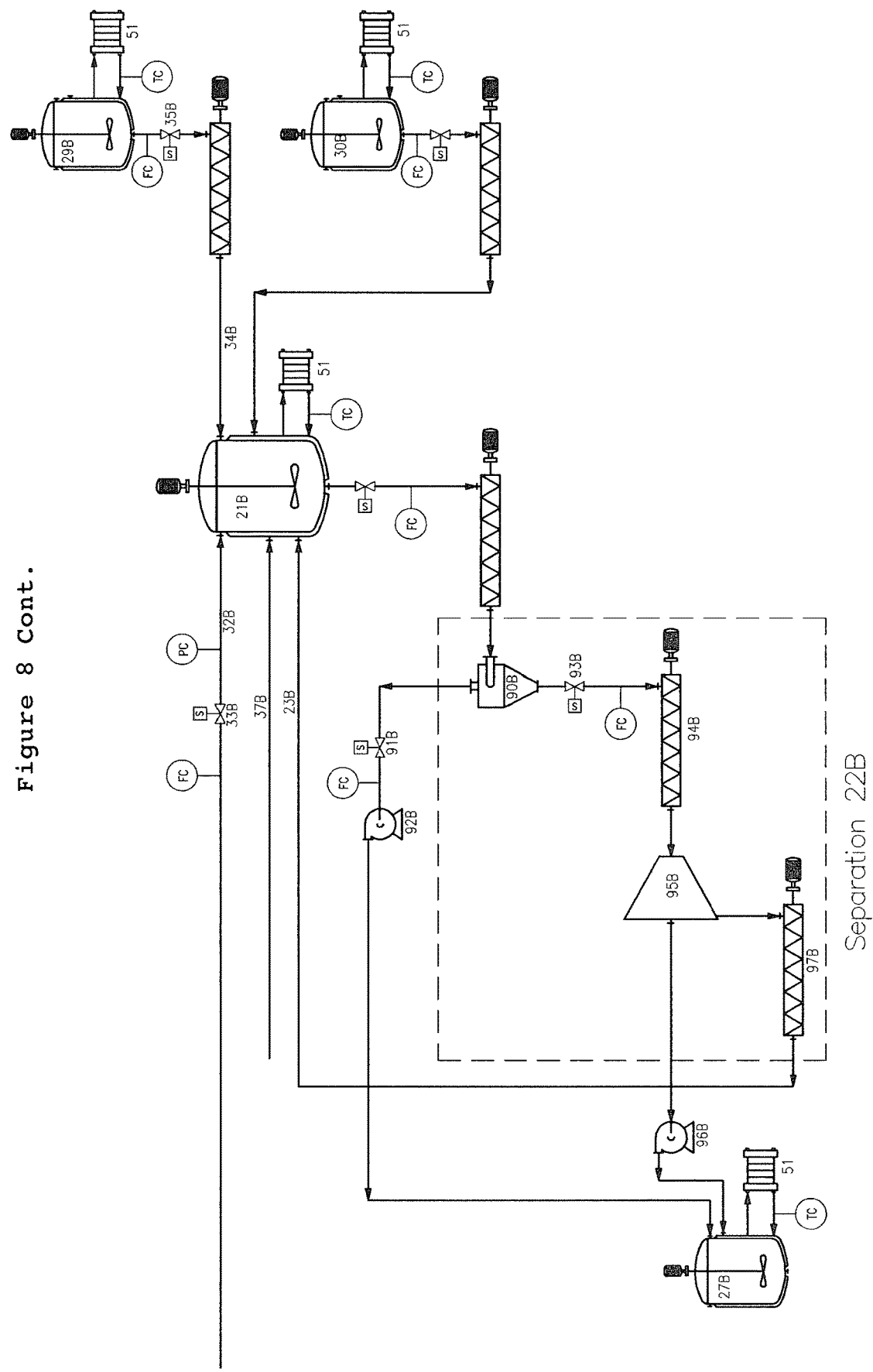

FIG. 8 illustrates an apparatus for converting bicarbonate to a concentrated formate solution (e.g., of not less than 4M, for example, from 10M to ~16M) by a reaction with hydrogen, with the aid of a solid catalyst, such as Pd/C. In the specific apparatus illustrated in FIG. 8, the hydrogenation reaction takes place alternately in reactors (21A) or (21B). For example, the reactors (21A) and (21B) may operate in a batch mode, that is, the hydrogenation reaction takes place in one reactor only at a given time period under batch mode of operation, while the other reactor serves the purpose of catalyst regeneration. In other words, once the reaction is completed in one reactor, this reactor switches to a cleaning mode, and the second reactor start operating in the hydrogenation reaction. The apparatus shown in FIG. 8 is therefore similar to the apparatus of FIG. 6 (similar elements are indicated by the same numerals). However, the separation units are described in more detail in reference to the apparatus of FIG. 8.

Once the rate of reaction in reactor (21A) has dropped below an acceptable level, the reaction in reactor (21A) is halted. The effluent is withdrawn from reactor (21A) and directed to separation unit (22A) equipped with hydro-cyclone (90A). Clarified potassium formate from hydro-cyclone flows through valve (91A) and flow controlled (FC) pump (92A) to vessel (27A). Vessel (27A) is stirred and temperature controlled (TC) and connected to a heat exchanger (51).

The slurry separated in hydro-cyclone (90A), consisting of the solid catalyst and potassium bicarbonate, flows through valve (93A) and pumped by flow controlled (FC) pump (94A) and fed into a separator (95A)—filter or centrifugal separation (decanter centrifuge, disc centrifuge, basket centrifuge, etc.) Clarified potassium formate solution is driven by pump (96A) to vessel (27A). The solid from separator (95A) is pumped (97A) back via line (23A) to the reactor (21A), where catalyst may be regenerated; feed lines (37A) and (37B) indicate incoming oxidizer streams (e.g., air streams) supplied to reactors (21A) and (21B) for catalyst regeneration, as explained above. Once the hydrogenation reaction in reactor (21A) is terminated, production of formate solution switches to reactor (21B), that is, bicarbonate held in (29B), hydrogen (31) and catalyst (30B) are fed to reactor (21B) to generate formate solution.

EXAMPLES

Preparation 1

[{RuCl$_2$ (cymene)}$_2$]

A solution of hydrated ruthenium trichloride (2 g, approx. 7.7 mole) in 100 mL ethanol is treated with 10 mL α-phellandrene and heated under reflux in a 150-mL, round-bottomed flask for 4 hours under nitrogen atmosphere. The solution is allowed to cool to room temperature, and the red-brown, microcrystalline product is filtered off. Additional product is obtained by evaporating the orange-yellow filtrate under reduced pressure to approximately half-volume and refrigerating overnight.

Preparation 2

Supported Palladium Catalyst

Palladium (II) nitrate dihydrate (0.096 mmol, Sigma 76070) was dissolved in water (1 L). Activated carbon (Sigma C-3345) was heated to 200° C. for 1 hour. The treated activated carbon (25 g in order to get 0.4% Pd/C) was added into the palladium solution and stirring was activated to 700 rpm for 1 hour. Then an aqueous solution of potassium formate (0.081 g in 200 ml of water) that was used as a reduction agent was added dropwise for 30 minutes at 25° C. (molar ratio between palladium and reduction agent is 10:1, total concentration of formate in the vessel was 0.008M). Following that the mixture was left while stirring continued at room temperature for 24 hours. After 24 hours the mixture was filtered, washed thoroughly with deionized water and left to dry at room temperature.

Examples 1-7

Dehydrogenation of Aqueous Potassium Formate with the Aid of Ruthenium Catalyst Precursor and Phosphorous Ligand Dissolved in a Single Organic Solvent Dppm in an organic solvent was heated at 60° C. during 15 min, followed by the addition of aqueous potassium formate solution with a concentration 15.7 M. The ruthenium source, [{RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [organic solvent used, volume of organic solvent ($V_{solvent}$), volume of KHCO$_2$ solution ($V_{KHCO2}$) and number of moles of ruthenium metal source added ($n_{Ru}$); the molar ratio Ru:DPPM was 1:3 in all of these examples] are set out in Table 1, along with the performance of the catalyst measured after one hour.

TABLE 1

| Example | solvent | $V_{solvent}$ (ml) | $V_{KHCO2}$ (ml) | $n_{Ru}$ (mmol) | TON (1 h) |
|---|---|---|---|---|---|
| 1 | dichloroethane | 2 | 18 | 0.08 | 46.04 |
| 2 | trichloroethane | 2 | 18 | 0.08 | 56.27 |
| 3 | 2-octanol | 2 | 18 | 0.08 | 51.15 |
| 4 | trimethylhexanol | 2 | 18 | 0.08 | 71.62 |
| 5 | ethylHexanol | 10 | 10 | 0.2 | 51.15 |
| 6 | butylacetate | 10 | 10 | 0.2 | 20.46 |
| 7 | hexanol | 10 | 10 | 0.2 | 104.35 |

Examples 8-10

Dehydrogenation of Aqueous Alkali Formate with the Aid of Ruthenium Catalyst Precursor and Phosphorous Ligand Dissolved in a Mixture of Solvents Consisting of Aliphatic Solvent and Alkanol Dppm (0.6 mmol) in a 10 ml mixture of organic solvents (S1:S2) was heated at 60° C. during 15 min, followed by the addition of 10 ml of aqueous potassium formate solution (with a concentration 15.7 M; 0.16 mol). 0.2 mmol The ruthenium source, [{RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [mixture of organic solvents used (S1:S2) and their volumetric ratio ($V_{s1}:V_{s2}$)] are set out in Table 2, along with the performance of the catalyst measured after one hour.

TABLE 2

| Example | S1:S2 | $V_{S1}:V_{S2}$ | TON (1 h) |
|---|---|---|---|
| 8 | 2,2,4-trimethylpentane:ethanol | 1:1 | 14.94 |
| 9 | Heptane:ethanol | 3:1 | 81.85 |
| 10 | Methylcyclohexane:ethanol | 1:1 | 35.40 |

Examples 11-14

Dehydrogenation of Aqueous Alkali Formate with the Aid of Ruthenium Catalyst Precursor and Phosphorous Ligand Dissolved in a Mixture of Solvents Consisting of Aromatic Solvent and Alkanol Dppm in a solvent mixture (S1:S2) was heated at 60° C. during 15 min, followed by the addition of aqueous potassium formate solution with a concentration 15.7 M. The ruthenium source, [(RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details (mixture of organic solvents used (S1:S2), the volumes of the two solvents ($V_{s1}$ and $V_{s2}$, respectively), volume of KHCO$_2$ solution ($V_{KHCO2}$) and number of moles of ruthenium metal source added ($n_{Ru}$); the molar ratio Ru:DPPM was 1:3 in all of these examples) are set out in Table 3, along with the performance of the catalyst measured after one hour.

TABLE 3

| Example | S1:S2 | $V_{S1}$ (ml):$V_{S2}$ (ml) | $V_{KHCO2}$ (ml) | $n_{Ru}$ (mmol) | TON (1 h) |
|---|---|---|---|---|---|
| 11 | Xylene:butanol | 5:5 | 2.5 | 0.04 | 133 |
| 12 | Mesitylene:butanol | 0.6:1.4 | 18 | 0.08 | 153.46 |

TABLE 3-continued

| Example | S1:S2 | $V_{S1}$ (ml):$V_{S2}$ (ml) | $V_{KHCO2}$ (ml) | $n_{Ru}$ (mmol) | TON (1 h) |
|---|---|---|---|---|---|
| 13 | Cymene:butanol | 4:6 | 10 | 0.2 | 151.42 |
| 14 | Toluene:ethanol | 7.5:2.5 | 10 | 0.2 | 110.49 |

Examples 15-18

Dehydrogenation of Aqueous Alkali Formate with the Aid of Ruthenium Catalyst Precursor and Phosphorous Ligand Dissolved in a Mixture of Solvents Consisting of Halogenated Hydrocarbon and Alkanol Dppm in a solvent mixture (S1:S2) was heated at 60° C. during 15 min, followed by the addition of aqueous potassium formate solution with a concentration 15.7 M. The ruthenium source, [(RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [mixture of organic solvents used (S1:S2), the volumes of the two solvents ($V_{s1}$ and $V_{s2}$, respectively), volume of KHCO$_2$ solution ($V_{KHCO2}$) and number of moles of ruthenium metal source added ($n_{Ru}$); the molar ratio Ru:DPPM was 1:3 in all of these examples] are set out in Table 4, along with the performance of the catalyst measured after one hour.

TABLE 4

| Ex. | S1:S2 | $V_{S1}$ (ml):$V_{S2}$ (ml) | $V_{KHCO2}$ (ml) | $n_{Ru}$ (mmol) | TON (1 h) |
|---|---|---|---|---|---|
| 15 | tetrachlorethylene:butanol | 0.8:1.2 | 18 | 0.04 | 93.98 |
| 16 | trichlorethylene:butanol | 1:1 | 20 | 0.08 | 51.15 |
| 17 | trichloroethane:butanol | 1:1 | 20 | 0.16 | 66.50 |
| 18 | 1,2 dichloroethane:ethanol | 15:5 | 5 | 0.01 | 122.77 |

Examples 19-22

Dehydrogenation of Aqueous Alkali Formate with the Aid of Ruthenium Catalyst Precursor and Phosphorous Ligand Dissolved in a Mixture of Solvents Consisting of Polar Aprotic Solvent and Alkanol Dppm in a solvent mixture (S1:S2) was heated at 60° C. during 15 min, followed by the addition of aqueous potassium formate solution with a concentration 15.7 M. The ruthenium source, [(RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [mixture of organic solvents used (S1:S2), volumes of the two solvents ($V_{s1}$ and $V_{s2}$, respectively), volume of KHCO$_2$ solution ($V_{KHCO2}$) and number of moles of ruthenium metal source added ($n_{Ru}$); the molar ratio Ru:DPPM was 1:3 in all of these examples] are set out in Table 5, along with the performance of the catalyst measured after one hour.

TABLE 5

| Ex. | S1:S2 | $V_{S1}$ (ml):$V_{S2}$ (ml) | $V_{KHCO2}$ (ml) | $n_{Ru}$ (mmol) | TON (1 h) |
|---|---|---|---|---|---|
| 19 | Ethyl acetate:butanol | 1:1 | 20 | 0.8 | 30.69 |
| 20 | methylethylketone:butanol | 1:1 | 20 | 0.16 | 51.15 |
| 21 | anisole:ethanol | 3.75:1.25 | 15 | 0.2 | 104.42 |
| 22 | butylacetate:butanol | 5:5 | 10 | 0.2 | 102.31 |

Examples 23-24

Dehydrogenation of Aqueous Alkali Formate with the Aid of Ruthenium Catalyst Precursor and Phosphorous Ligand Dissolved in a Mixture of Solvents Consisting of a Carbonate Solvent and Alkanol Dppm in 10 ml of a solvent mixture (S1:S2) was heated at 60° C. during 15 min, followed by the addition of aqueous potassium formate solution with a concentration 14 M. The ruthenium source, [{RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [mixture of organic solvents used (S1:S2), volumes of the two solvents ($V_{s1}$ and $V_{s2}$, respectively), volume of KHCO$_2$ solution ($V_{KHCO2}$) and number of moles of ruthenium metal source added ($n_{Ru}$); the molar ratio Ru:DPPM was 1:3 in all of these examples] are set out in Table 6, along with the performance of the catalyst measured after one hour and three hours.

TABLE 6

| Ex. S1:S2 | $V_{S1}$ (ml):$V_{S2}$ (ml) | $V_{KHCO2}$ (ml) | $n_{Ru}$ (µmol) | TON (1 h); (3 h) |
|---|---|---|---|---|
| 23 Dimethylcarbonate:butanol | 6.0:4.0 | 1.46 | 10 | 204.6; 532.0 |
| 24 Diethylcarbonate:ethanol | 7.5:2.5 | 2.96 | 20 | 522.1; 1044.2 |

Examples 25-27

Dehydrogenation of Aqueous Alkali Formate with the Aid of Ruthenium Catalyst Precursor and Phosphorous Ligand Dissolved in a Mixture Consisting of Diethyl Carbonate and Ethanol Dppm (30.0 µmol) in a mixture consisting of diethyl carbonate and ethanol (S1:S2) was heated at 60° C. during 15 min, followed by the addition of aqueous alkali formate solution. 10 µmol of the ruthenium source, [{RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate.

The experimental details [volumes of the two organic solvents ($V_{s1}$ and $V_{s2}$, respectively), alkali formate solution (MHCO$_2$), its concentration ($C_{MHCO2}$) and volume ($V_{MHCO2}$)] are set out in Table 7, along with the performance of the catalyst measured after one hour.

TABLE 7

| Example | $V_{S1}$ | $V_{S2}$ | MHCO$_2$ | $C_{MHCO2}$ (M) | $V_{MHCO2}$ (ml) | TON (1 h) |
|---|---|---|---|---|---|---|
| 25 | 16 | 4 | NaHCO$_2$ | 4 | 5 | 409.2 |
| 26 | 15 | 5 | KHCO$_2$ | 4 | 2 | 204.6 |
| 27 | 7.5 | 2.5 | KHCO$_2$ | 10 | 2.5 | 1253.0 |

Examples 28-29 (of the Invention) and 30 (Comparative)

Dehydrogenation of Aqueous Alkali Formate with the Aid of Ruthenium Catalyst Dissolved in a Mixture of Solvents in the Presence of Formic Acid In the next set of Examples, the effect of addition of formic acid on the dehydrogenation of alkali formate at different temperatures was investigated.

Dppm (75 µmol) in 10 ml of a solvent mixture consisting of tetrachloroethylene and ethanol (1:1 volumetric ratio) was heated at a fixed temperature during 15 min, followed by the addition of aqueous potassium formate solution with a concentration 15.7 M and 0.7 ml of formic acid (illustrated in Examples 28 and 29; Example 30 is a comparative example, devoid of potassium formate). Then, 98 µmol of the ruthenium source, [{RuCl$_2$(cymene)}$_2$] commercially available from Sigma (Ru:L=1:2) was introduced into the reaction mixture at the fixed temperature. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [Reaction temperature] along with the performance of the catalyst measured after one hour and three hours are set forth in Table 8.

TABLE 8

| Example | T (° C.) | TON (1 h); (3 h) |
|---|---|---|
| 28 | 40 | 31.3; 292.4 |
| 29 | 60 | 563.9; 835.4 |
| 30 | 60 | 41.8; 62.7 |

Examples 31-33

Dehydrogenation of Aqueous Alkali Formate with the Aid of Ruthenium Catalyst Precursor and Phosphorous Ligand Dissolved in a Mixture of Solvents in the Presence of a Surfactant In the next set of Examples, the effect of addition of surfactant(s) on the dehydrogenation of alkali formate was investigated. The surfactant was added to the solvents mixture. When a pair of surfactants was tested, the surfactants were added separately to the organic and aqueous components.

Dppm in 10 ml of a solvent mixture (S1:S2), which was previously mixed with a surfactant A, was heated at 60° C. during 15 min, followed by the addition of 10 ml aqueous potassium formate solution with a concentration 15.7 M, to which surfactant B was previously charged.

Then, ruthenium source, [{RuCl$_2$(cymene)}$_2$] commercially available from Sigma, was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details [mixture of organic solvents used (S1:S2) and the volumetric ratio between the two solvents, surfactant A added to the organic phase; surfactant B added to the aqueous solution; number of moles of ruthenium metal source added ($n_{Ru}$); the molar ratio Ru:DPPM was 1:3 in all of these examples] are set out in Table 9, along with the performance of the catalyst measured after one hour.

TABLE 9

| Ex. S1:S2 | Surfactant A (% wt)* | Surfactant B (% wt)** | $n_{Ru}$ (µmol) | TON (1 h) |
|---|---|---|---|---|
| 31 Tetrachloroethylene:butanol | Aliquat (10%) | — | 98 | 125.3 |
| 32 Tetrachloroethylene:butanol | TBACl (10%) | — | 98 | 167.1 |
| 33 mesitylene:butanol | Span 80 (1%) | Tween 80 (9%) | 198 | 250.6 |

*% by weight based on the organic phase
**% by weight based on the organic phase

Example 34

Dehydrogenation of Aqueous Alkali Formate with the Aid of Ruthenium Catalyst Precursor and Phosphorous Ligand Dissolved in a Mixture of Solvents Dppm (44.09 mmol) in a mixture consisting of 375 ml of mesitylene and ethanol (1:1 volumetric ratio) was heated at 60° C. during 15 min, followed by the addition of 375 ml of aqueous alkali formate solution. 14.69 mmol of the ruthenium source, [{RuCl$_2$(cymene)}$_2$] commercially available from Sigma, was introduced into the reaction mixture at 60° C. The reaction mixture was stirred with a mechanical stirrer (1400 rpm). Gas evolution then started, and the gas was collected with an automatic gas burette. At the end of the reaction, the organic phase was separated easily from the bicarbonate. The number TON after 15 min was evaluated at 83.57.

Examples 35-65

Dehydrogenation of Aqueous Alkali Formate with the Aid of Ruthenium Catalyst Precursor and Phosphorous Ligand Dissolved in a Mixture of Solvents Under Different Conditions The data presented in Table 10 illustrate the efficacy of the dehydrogenation reaction under various conditions. The data were generated during experiments carried out according to the typical procedures set forth in previous examples.

Examples 66-72

Preparation of Storable Metal-Solution Catalysts and their Use for Dehydrogenating Formate In the next set of Examples, several active catalysts (designated M1-M7) were prepared in advance, stored for a period of time of about one day to fifteen days, and then tested in the dehydrogenation reaction.

a) Preparation Metal-Solution Catalytic M1:

Dppm (0.6 mmol) in 10 ml of anisole:butanol (1:1) mixture was heated at 60° C. during 15 min, followed by the addition of 10 ml of aqueous potassium formate solution (15.7 M PF; 0.16 mol). 0.2 mmol of the ruthenium source, [{RuCl$_2$(cymene)}$_2$] commercially available from Sigma, (Ru:L=1:3) was introduced into the preparation mixture at 60° C. After 10 minutes of stirring with a magnetic stirrer (1500 rpm), the catalytic organic liquid phase (M1) was separated easily from the aqueous phase and stoked under argon.

b) Preparation metal-solution catalytic M2 at 80° C.:

Dppm (0.6 mmol) in 10 ml of mesitylene:butanol (2:3) mixture was heated at 80° C. during 15 min, followed by the addition of 10 ml of aqueous potassium formate solution (15.7 M PF; 0.16 mol). 0.2 mmol of the ruthenium source, [{RuCl$_2$(cymene)}$_2$] commercially available from Sigma, (Ru:L=1:3) was introduced into the preparation mixture at 80° C. After 5 minutes of stirring with a magnetic stirrer (1500 rpm), the catalytic organic liquid phase (M2) was separated easily from the aqueous phase and stoked under argon.

TABLE 10

| Ex. | S1:S2 | $V_{S1}$ (ml); $V_{S2}$ (ml) | $V_{KHCO2}$ (ml) | $n_{Ru}$ (µmol) | Ru:L | TON (1 h) |
|---|---|---|---|---|---|---|
| 35 | Anisole:ethanol | 6; 4 | 10 | 196.0 | 1:3 | 302.8 |
| 36 | Anisole:butanol | 5; 5 | 10 | 196.0 | 1:3 | 156.6 |
| 37 | Anisole:butanol | 5; 5 | 10 | 196.0 | 1:2 | 250.6 |
| 38 | Anisole:pentanol | 4; 6 | 10 | 196.0 | 1:3 | 271.5 |
| 39 | Anisole:hexanol | 2; 8 | 10 | 196.0 | 1:3 | 168.3 |
| 40 | MEK:ethanol | 6; 4 | 10 | 200.0 | 1:3 | 145.3 |
| 41 | MEK:ethanol | 15; 5 | 5 | 10.0 | 1:3 | 409.2 |
| 42 | MEK:butanol | 1; 1 | 20 | 80.0 | 1:3 | 133.0 |
| 43 | MEK:butanol | 5; 5 | 10 | 200.0 | 1:3 | 87.0 |
| 44 | Ethyl acetate:ethanol | 15; 5 | 5 | 10.0 | 1:3 | 532.0 |
| 45 | Ethyl acetate:butanol | 1; 1 | 20 | 160.0 | 1:3 | 70.34 |
| 46 | Mesitylene:ethanol | 5; 5 | 10 | 196.0 | 1:2 | 313.3 |
| 47 | Mesitylene:butanol | 4; 6 | 10 | 196.0 | 1:2 | 167.1 |
| 48 | Mesitylene:pentanol | 3; 7 | 10 | 196.0 | 1:3 | 167.1 |
| 49 | Mesitylene:hexanol | 3; 7 | 10 | 196.0 | 1:3 | 114.86 |
| 50 | Mesitylene:ethylhexanol | 2; 8 | 10 | 200.0 | 1:3 | 24.55 |
| 51 | Xylene:ethanol | 15; 5 | 5 | 10.0 | 1:3 | 409.2 |
| 52 | Xylene:pentanol | 7; 3 | 2.5 | 40.0 | 1:3 | 51.2 |
| 53 | Xylene:pentanol | 5; 5 | 2.5 | 40.0 | 1:3 | 194.4 |
| 54 | Dichloroethane:butanol | 1; 1 | 20 | 48.0 | 1:3 | 149.2 |
| 55 | Trichloroethane:ethanol | 15; 5 | 5 | 10.0 | 1:3 | 204.6 |
| 56 | Trichloroethane:butanol | 1; 1 | 20 | 80.0 | 1:3 | 112.5 |
| 57 | Trichloroethylene:butanol | 1; 1 | 20 | 160.0 | 1:3 | 102.3 |
| 58 | Tetrachloroethylene:ethanol | 7; 3 | 10 | 196.0 | 1:3 | 177.5 |
| 59 | Tetrachloroethylene:butanol | 4; 6 | 2.5 | 39.2 | 1:3 | 86.7 |
| 60 | Tetrachloroethylene:butanol | 8; 8 | 4 | 313.5 | 1:2 | 126.6 |
| 61 | Tetrachloroethylene:pentanol | 0.8; 1.2 | 18 | 39.2 | 1:3 | 229.7 |
| 62 | Dimethyl carbonate:ethanol | 16; 4 | 5 | 10.0 | 1:3 | 1677.9 |
| 63 | Dimethyl carbonate:butanol | 1; 1 | 20 | 160.0 | 1:3 | 117.7 |
| 64 | Diethyl carbonate:ethanol | 15; 5 | 10 | 10.0 | 1:3 | 2250.8 |
| 65 | Diethyl carbonate:butanol | 5; 5 | 2.5 | 19.6 | 1:3 | 835.4 | c) Preparation Metal-Solution Catalytic M3, M4, M5, M6 and M7 with Different Reducing Agents:

Dppm (0.12 mmol) in 2 ml of tetrachloroethylene:butanol (1:1) mixture was heated at 60° C. during 15 min, followed by the addition of 0.5 ml of aqueous reducing solution (containing 4 mmol of reducer agent: sodium borohydride for M3, formic acid for M4, potassium citrate for M5 or citric acid for M6) or 2.5 ml of aqueous potassium formate solution (15.7 M PF; 4 mmol) for M7. 40 µmol of the ruthenium source, [{RuCl$_2$(cymene)}$_2$] commercially available from Sigma, (Ru:L=1:3) was introduced into the preparation mixture at 60° C. After 30 minutes of stirring with a magnetic stirrer (1500 rpm), the catalytic preparation mixture is cooled and stoked under argon.

The catalysts M1-M7 were stored (see storage periods in the Table 11 below) and used in the dehydrogenation reaction according to the following typical procedure. The metal-containing solution was heated at 60° C. during 15 min, followed by the addition of aqueous potassium formate solution (15.7 M) heated previously at 60° C. The reaction mixture was stirred with a magnetic stirrer (1500 rpm). Gas evolution then started and the gas evolved was collected with an automatic gas burette. At the end of the reaction, the organic phase was separated easily from the bicarbonate.

The experimental details and the performance of the catalysts are set out in Table 11.

TABLE 11

| Example | catalyst | Storage period (days) | $V_{catalyst}$ (ml) | $V_{KHCO2}$ (ml) | TON (1 h) |
|---------|----------|-----------------------|---------------------|------------------|-----------|
| 66 | M1 | 1 | 2 | 18 | 313.3 |
| 67 | M2 | 15 | 10 | 10 | 177.5 |
| 68 | M3 | 1 | 2 | 4.5 | 208.8 |
| 69 | M4 | 1 | 2 | 4.5 | 261.1 |
| 70 | M5 | 1 | 2 | 4.5 | 104.4 |
| 71 | M6 | 7 | 2 | 4.5 | 261.1 |
| 72 | M7 | 7 | 2 | 4.75 | 417.7 |

Examples 73-75

Dehydrogenation of Aqueous Alkali Formate with the Aid of Various Metal Catalysts Dissolved in a Mixture Consisting of Diethyl Carbonate and Ethanol Dppm (0.4 mmol) in 10 ml of tetrachloroethylene:butanol (1:1) mixture was heated at 60° C. during 15 min, followed by the addition of 10 ml of aqueous potassium formate solution (15.7 M PF; 0.16 mol). 0.2 mmol of the metal source, [IrCl(CO) [P(Ph)]$_2$], [RhCl[P(Ph)$_3$]$_3$] or [Pd(OAc)$_2$] commercially available from Sigma, (Ru:L=1:3) was introduced into the reaction mixture at 60° C., which was stirred with a magnetic stirrer (1500 rpm). Gas evolution then started, and the gas was collected with an automatic gas burette. At the end of the reaction, the organic phase was separated easily from the bicarbonate slurry. The performance of the catalysts was measured after twenty four hours and is reported in Table 12.

TABLE 12

| Example | metal source | TON (24 h) |
|---------|--------------|------------|
| 73 | IrCl(CO)[P(Ph)$_3$]$_2$ | 46.0 |
| 74 | RhCl[P(Ph)$_3$]$_3$ | 35.8 |
| 75 | Pd(OAc)$_2$ | 69.6 |

Examples 76-79

Dehydrogenation of Aqueous Alkali Formate with the Aid of Ruthenium Catalysts Prepared from Various Ruthenium Sources and Dissolved in a Solvent Mixture In this set of examples, different ruthenium compounds were used as the metal source. The ligand employed in all experiments was the same (DPPM). The ruthenium sources tested were:

[RuCl$_3$] (R1); [RuCl$_2$[P(Ph)$_3$]$_3$] (R2); [{RuCl$_2$(benzene)}$_2$] (R3); and [{RuCl$_2$(Hexamethylbenzene)}$_2$] (R4), all commercially available from Sigma.

Dppm in solvent mixture (S1:S2) was heated at 60° C. during 15 min, followed by the addition of aqueous alkali formate solution. The ruthenium source was introduced into the reaction mixture at 60° C. ((Ru:L=1:3). The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details and performance of the catalysts, which was measured after twenty four hours, are tabulated in Table 13 (DMC=dimethyl carbonate; DEC=diethyl carbonate).

TABLE 13

| Ex. | Ru source | $n_{Ru}$ (µmol) | S1:S2 | $V_{S1}$ (ml):$V_{S2}$ (ml) | MHCO$_2$ $C_{MHCO2}$ (M) | $V_{MHCO2}$ (ml) | TON (1 h) |
|-----|-----------|-----------------|-------|------------------------------|---------------------------|------------------|-----------|
| 76 | R1 | 25 | DMC:ethanol | 15:5 | NaHCO2 4M | 5 | 81.85 |
| 77 | R2 | 25 | DMC:ethanol | 15:5 | KHCO2 4M | 5 | 204.6 |
| 78 | R3 | 10 | DEC:ethanol | 16:4 | NaHCO2 4M | 5 | 732.6 |
| 79 | R4 | 214 | Mesitylene:butanol | 4:6 | KHCO2 16M | 10 | 430.5 |

Examples 80-82

Dehydrogenation of Aqueous Alkali Formate with the Aid of Ruthenium Catalysts Dissolved in a Solvent Mixture Consisting of Tetrachloroethylene and Butanol (in the Absence of Additive Ligand)

Tetrachloroethylene:butanol (1:1) mixture was heated at 60° C. during 15 min, followed by the addition of aqueous potassium formate solution (15.7M). The ruthenium source, [Milstein's catalyst] (R5), [Ru(COD)Cl$_2$]n] (R6), or [Ru-MACHO®] (R7) commercially available from Sigma, was introduced into the reaction mixture at 60° C. The reaction mixture was stirred with a magnetic stirrer (1500 rpm). Gas evolution then started, and the evolved gases were collected with an automatic gas burette. At the end of the reaction, the organic phase was separated easily from the bicarbonate slurry.

The experimental details [volume of the solvent mixture ($V_{s1+s2}$), volume of KHCO$_2$ solution ($V_{KHCO2}$) and number of moles of ruthenium metal source added ($n_{Ru}$)] are set out in Table 14, along with the performance of the catalyst measured after three hours.

TABLE 14

| Ex. | Ru source | $n_{Ru}$ (mmol) | $V_{S1+S2}$ (ml) | $V_{MHCO2}$ (ml) | TON (3 h) |
|---|---|---|---|---|---|
| 80 | R5 | 0.2 | 15 | 5 | 30.7 |
| 81 | R6 | 0.2 | 15 | 5 | 61.4 |
| 82 | R7 | 0.32 | 16 | 4 | 188.6 |

Examples 83-86

Dehydrogenation of Aqueous Alkali Formate with the Aid of Ruthenium Catalyst Precursor and Various Additive Ligands Dissolved in a Solvent Mixture In this set of examples, the metal source used was [RuCl$_2$(cymene)]$_2$ in all experiments, but the ligands were changed. The following ligands were tested:

1,3 bis(diphenylphosphinomethyl)benzene (L1); triphenylphosphine (P(Ph)$_3$) (L2); (1S,2S)-p-Tosyl-1,2-diphenylethylenediamine (tsdpen) (L3) or tetraphos (PP3) (L4).

The ligand was heated at 60° C. during 15 min in tetrachloroethylene:butanol (1:1) mixture, followed by the addition of aqueous potassium formate solution (15.7M). The ruthenium source, [{RuCl$_2$(cymene)}$_2$] commercially available from Sigma, (Ru:L=1:2), was introduced into the reaction mixture at 60° C. The reaction mixture was stirred with a magnetic stirrer (1500 rpm). Gas evolution then started, and the gas was collected with an automatic gas burette. At the end of the reaction, the organic phase was separated easily from the bicarbonate slurry.

The experimental details along with the performance of the catalyst measured after one hour and three hours are set forth in Table 15.

TABLE 15

| Example | ligand | $n_{Ru}$ (mmol) | $V_{S1+S2}$ (ml) | $V_{MHCO2}$ (ml) | TON (1 h) | TON (3 h) |
|---|---|---|---|---|---|---|
| 83 | L1 | 25 | 10 | 10 | 10.2 | 35.8 |
| 84 | L2 | 25 | 10 | 10 | 4.1 | 57.3 |
| 85 | L3 | 10 | 10 | 4 | 26.9 | 99.1 |
| 86 | L4 | 214 | 10 | 4 | 7.7 | 35.2 |

Examples 87-89

Dehydrogenation of Aqueous Alkali Formate with the Aid of Ruthenium Catalyst Dissolved in Diethyl Carbonate Dppm (30.0 µmol) in 20 ml of diethyl carbonate (in the presence of some ethanol) was heated at 60° C. during 15 min, followed by the addition of aqueous alkali formate solution (4M; 20 mmol dissolved in 5 ml of water). 5 µmol of the Ru source, [{RuCl$_2$(cymene)}$_2$] of Preparation 1, or [{RuCl$_2$(benzene)}$_2$] commercially available from Sigma, was introduced into the reaction mixture at 60° C., which was stirred with a magnetic stirrer (1000 rpm). Gas evolution then started, and the evolved gases were collected with an automatic gas burette.

At the end of the reaction, the organic phase was separated easily from the bicarbonate. Notably, the reaction is devoid of CO$_2$ formation.

The experimental details, amount of hydrogen gas generated (measured after three hours of reaction) and the performance of the catalysts are set out in Table 16.

TABLE 16

| Example | MHCO$_2$ solution | Ru complex source | $V_{H2}$ (ml) | TOF (min$^{-1}$) | TON (3 h) |
|---|---|---|---|---|---|
| 87 | NaHCO$_2$ | [{RuCl$_2$(cymene)}$_2$] | 350 | 11.94 | 1432.31 |
| 88 | NaHCO$_2$ | [{RuCl$_2$(benzene)}$_2$] | 250 | 10.91 | 1023.08 |
| 89 | KHCO$_2$ | [{RuCl$_2$(cymene)}$_2$] | 260 | 6.82 | 1064.00 |

Example 90 (Comparative)

Dehydrogenation of Aqueous Alkali Formate with the Aid of Ruthenium Catalyst Dissolved in DMF According to Angew. Chem. Int. Ed. 50, p. 6411-6414(2011)

Dppm (30 µmol) in 120 ml of DMF was heated at 60° C. during 15 min, followed by the addition of 5 ml of aqueous potassium formate solution (4 M; 20 mmol). 10 µmol of the ruthenium source, [{RuCl$_2$(benzene)}$_2$], commercially available from Sigma, (Ru:L=1:3) was introduced into the reaction mixture at 60° C., which was stirred with a magnetic stirrer (1000 rpm). Gas evolution then started, and the evolved gases were collected with an automatic gas burette.

Figure 9:
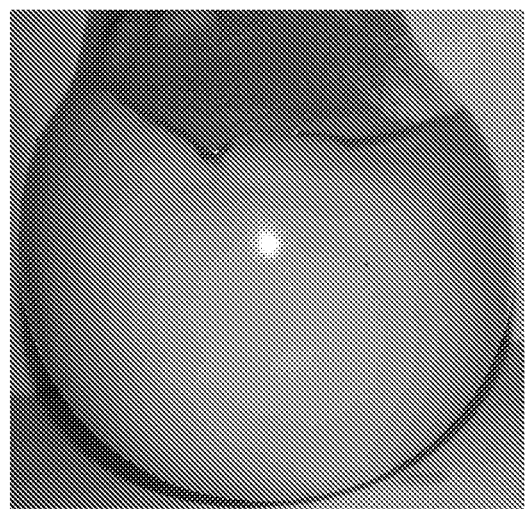
FIG. 9 provides photos showing the solidification of the reaction mixture under prior art conditions (A) as opposed to the fluid, easily separable reaction mixture obtained according to the invention (B).
Figure 9:
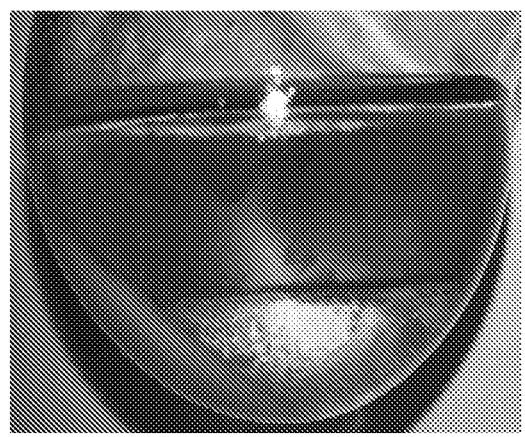

Shortly after set off of the reaction, the formed non-soluble product, bicarbonate, precipitates and causes the reaction mixture to solidify. A white solid is formed which traps the catalyst and the catalytic reaction. A photo of the white solid mixture formed during the reaction is shown in FIG. 9A. For the purpose of comparison, a photo showing the fluid, easily separable reaction mixture (B) obtained according to a typical procedure set forth in the previous examples, is also provided (using [{RuCl$_2$(cymene)}$_2$] in diethyl carbonate:ethanol]. The two separable phases in the reaction mixture (B) are readily visible: the upper yellow layer consists of the organic catalytic system and the lower layer is the aqueous formate phase with the white bicarbonate precipitate.

The invention claimed is:

1. A process for generating hydrogen, comprising decomposing in a reaction vessel aqueous alkali formate in the presence of a transition metal-containing catalyst system dissolved in one or more organic solvent(s), characterized in that said organic solvent(s) comprise at least one solvent which is water-immiscible, thereby releasing hydrogen and forming bicarbonate in the aqueous phase, and separating the catalyst-containing organic solvent(s) from said bicarbonate.

2. A process according to claim 1, wherein the alkali formate is $KHCO_2$.

3. A process according to claim 1, wherein the water-immiscible organic solvent is selected from the group consisting of aliphatic and cyclic hydrocarbons, aromatic hydrocarbons, halogenated hydrocarbons, esters, ketones, ethers, alkanols having not less than 6 carbon atoms and carbonate solvents.

4. A process according to claim 1, wherein the catalyst system is dissolved in a mixture of solvents comprising a first organic solvent, which is the water-immiscible solvent, and a second solvent, which is a polar solvent.

5. A process according to claim 4, wherein the second solvent is polar protic organic solvent.

6. A process according to claim 5, wherein the polar protic solvent is selected from the group consisting of C2-C6 alkanols.

7. A process according to claim 6, wherein the catalyst system is dissolved in a mixture of solvents comprising at least a first solvent and a second solvent, characterized in that the first solvent is an aliphatic or cyclic hydrocarbon selected from the group consisting of C6-C10 alkanes, C6-C10 alkenes, cycloalkanes and cycloalkenes, and the second solvent is selected from the group consisting of C2-C5 alkanols.

8. A process according to claim 6, wherein the catalyst system is dissolved in a mixture of solvents comprising at least a first solvent and a second solvent, characterized in that the first solvent is an aromatic hydrocarbon selected from the group consisting of alkyl-substituted benzenes, and the second solvent is selected from the group consisting of C2-C5 alkanols.

9. A process according to claim 6, wherein the catalyst system is dissolved in a mixture of solvents comprising at least a first solvent and a second solvent, characterized in that the first solvent is a halogenated hydrocarbon selected from the group consisting of halogenated C1-C3 alkanes, C2-C3 alkenes, halogen-substituted cyclic hydrocarbons and halogen-substituted aromatic hydrocarbons, and the second solvent is selected from the group consisting of C2-C5 alkanols.

10. A process according to claim 6, wherein the catalyst system is dissolved in a mixture of solvents comprising at least a first solvent and a second solvent, characterized in that the first solvent is selected from the group consisting of water-immiscible esters, water-immiscible ethers, water-immiscible ketones and water-immiscible alkanols having not less than 6 carbon atoms, and the second solvent is selected from the group consisting of C2-C5 alkanols.

11. A process according to claim 6, wherein the catalyst system is dissolved in a mixture of solvents comprising at least a first solvent and a second solvent, characterized in that the first solvent is a carbonate liquid selected from the group consisting of $(R_1)_n$—X—C(O)—X—$(R_2)_n$, where X indicates oxygen, $R_1$ and $R_2$, which may be the same or different, are C1-C3 alkyl groups and n is 1, and the second solvent is selected from the group consisting of C2-C5 alkanols.

12. A process according to claim 6, wherein the alkanol is selected from the group consisting of ethanol, n-butanol, n-pentanol and mixtures thereof.

13. A process according to claim 1, wherein the transition metal is a platinum-group metal.

14. A process according to claim 13, wherein the platinum-group metal is ruthenium.

15. A process according to claim 13, wherein the catalyst system comprises:
a catalyst precursor which is a platinum-group metal complex or a platinum-group metal salt;
and an additive phosphorous ligand.

16. A process according to claim 15, wherein the catalyst precursor is selected from the group consisting of $[RuX_2(arene)]_2$, wherein arene indicates an aromatic hydrocarbon selected from the group consisting of benzene and alkyl-substituted benzene, and X is halide.

17. A process according to claim 16, wherein the $[RuX_2(arene)]_2$ is $[RuX_2(cymene)]_2$.

18. A process according to claim 15, wherein the additive phosphorous ligand is selected from the group consisting of: 1,1-bis(diphenylphosphino)methane; 1,3 bis(diphenylphosphinomethyl)benzene; triphenylphosphine ($P(Ph)_3$) and tetraphos (PP3).

19. A process according to claim 15, wherein the catalyst system is activated in-situ.

20. A process according to claim 15, wherein the catalyst system is activated ex-situ, by combining in an organic solution the catalyst precursor and the additive phosphorous ligand in the presence of a reducing agent to form a catalytically active form, and supplying said organic solution to the reaction vessel to decompose formate.

21. A process according to claim 1, wherein a surfactant is present in the reaction vessel.

22. A process for generating hydrogen according to claim 1, comprising continuously feeding to the reaction vessel an aqueous $MHCO_2$ stream and an organic stream in which the metal-containing catalyst system is dissolved in the organic solvent(s), dehydrogenating said $MHCO_2$ in said reaction vessel, thereby releasing hydrogen and forming bicarbonate ($MHCO_3$) slurry, continuously discharging from said reaction vessel a reaction mixture consisting of solid bicarbonate and a liquid component, continuously separating the reaction mixture into solid and one or more liquid components, collecting said solid bicarbonate and recycling one or more liquid component(s) to said reaction vessel.

* * * * *